(12) United States Patent

Bowden et al.

(10) Patent No.: US 12,560,132 B2

(45) Date of Patent: *Feb. 24, 2026

---

(54) GAS TURBINE ENGINE WITH THIRD STREAM

(71) Applicant: General Electric Company, Evendale, OH (US)

(72) Inventors: William Joseph Bowden, Cleves, OH (US); Keith Edward James Blodgett, Milford, OH (US); Mustafa Dindar, West Chester, OH (US); David Cerra, Highlands Ranch, CO (US); James Hamilton Grooms, Hamilton, OH (US); Brandon Wayne Miller, Middletown, OH (US); Randy M. Vondrell, Newport, KY (US); David Marion Ostdiek, Liberty Township, OH (US); Craig William Higgins, Liberty Township, OH (US); Alexander Kimberley Simpson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,445

(22) Filed: Dec. 16, 2024

(65) Prior Publication Data

US 2025/0116243 A1     Apr. 10, 2025

Related U.S. Application Data

(63) Continuation-in-part of application No. 18/888,873, filed on Sep. 18, 2024, which is a continuation-in-part (Continued)

(51) Int. Cl.
F02K 3/065 (2006.01)
F02C 3/06 (2006.01)

(52) U.S. Cl.
CPC ................ F02K 3/065 (2013.01); F02C 3/06 (2013.01)

(58) Field of Classification Search
CPC ............ F02K 3/02; F02K 3/025; F02K 3/065; F02C 3/06; F02C 3/107; F02C 7/36
See application file for complete search history.

(56) References Cited

U.S. PATENT DOCUMENTS

| | | | |
|---|---|---|---|
| 2,999,630 A | 9/1961 | Warren et al. | |
| 3,528,250 A | 9/1970 | Johnson | |

(Continued)

FOREIGN PATENT DOCUMENTS

| | | |
|---|---|---|
| CN | 1204005 A | 1/1999 |
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Steven M Sutherland
(74) *Attorney, Agent, or Firm* — Dority & Manning, P.A.

(57) ABSTRACT

A gas turbine engine includes a turbomachine having a compressor section, a combustion section, and a turbine section arranged in serial flow order. The turbomachine defines an engine inlet to an inlet duct, a fan duct inlet to a fan duct, and a core inlet to a core duct. The primary fan is driven by the turbomachine, and a secondary fan is located downstream of the primary fan within the inlet duct. One or more actuation devices operably associated with the fan (Continued)

duct, the one or more actuation devices actuable to increase or decrease an exit area of the fan duct.

20 Claims, 37 Drawing Sheets

Related U.S. Application Data of application No. 18/675,270, filed on May 28, 2024, which is a continuation of application No. 17/879,384, filed on Aug. 2, 2022, now Pat. No. 12,031,504.

(56) References Cited

U.S. PATENT DOCUMENTS

| | | | |
|---|---|---|---|
| 3,540,682 | A | 11/1970 | Dibble et al. |
| 3,542,152 | A | 11/1970 | Adamson et al. |
| 3,750,402 | A | 8/1973 | Vdoviak et al. |
| 4,010,608 | A | 3/1977 | Simmons |
| 4,043,121 | A | 8/1977 | Thomas et al. |
| 4,446,696 | A | 5/1984 | Sargisson et al. |
| 4,486,146 | A | 12/1984 | Campion |
| 4,569,199 | A | 2/1986 | Klees et al. |
| 4,607,657 | A | 8/1986 | Hirschkron |
| 4,784,575 | A | 11/1988 | Nelson et al. |
| 4,860,537 | A | 8/1989 | Taylor |
| 4,892,269 | A | 1/1990 | Greco et al. |
| 4,907,946 | A | 3/1990 | Ciokajlo et al. |
| 4,916,894 | A | 4/1990 | Adamson et al. |
| 4,976,102 | A | 12/1990 | Taylor |
| 5,054,998 | A | 10/1991 | Davenport |
| 5,190,441 | A | 3/1993 | Murphy et al. |
| 5,197,855 | A | 3/1993 | Magliozzi et al. |
| 5,259,187 | A | 11/1993 | Dunbar et al. |
| 5,261,227 | A | 11/1993 | Giffin, III |
| 5,345,760 | A | 9/1994 | Giffin, III |
| 5,457,346 | A | 10/1995 | Blumberg et al. |
| 5,950,308 | A | 9/1999 | Koff et al. |
| 6,339,927 | B1 | 1/2002 | DiPietro, Jr. |
| 6,547,518 | B1 | 4/2003 | Czachor et al. |
| 6,763,654 | B2 | 7/2004 | Orlando et al. |
| 6,792,758 | B2 | 9/2004 | Dowman |
| 7,559,191 | B2 | 7/2009 | Parks |
| 7,658,063 | B1 | 2/2010 | Matheny |
| 7,762,766 | B2 | 7/2010 | Shteyman et al. |
| 8,256,202 | B1 | 9/2012 | Paulino |
| 8,276,392 | B2 | 10/2012 | van der Woude |
| 8,382,430 | B2 | 2/2013 | Parry et al. |
| 8,459,035 | B2 | 6/2013 | Smith et al. |
| 8,689,538 | B2 | 4/2014 | Sankrithi et al. |
| 8,762,766 | B2 | 6/2014 | Ferguson et al. |
| 8,876,465 | B2 | 11/2014 | Stretton |
| 8,910,465 | B2 | 12/2014 | Snyder |
| 8,943,796 | B2 | 2/2015 | McCaffrey |
| 8,967,967 | B2 | 3/2015 | Stretton et al. |
| 9,017,028 | B2 | 4/2015 | Fabre |
| 9,045,996 | B2 | 6/2015 | Anghel et al. |
| 9,057,328 | B2 | 6/2015 | Kupratis |
| 9,096,312 | B2 | 8/2015 | Moxon |
| 9,097,134 | B2 | 8/2015 | Ferch et al. |
| 9,534,538 | B1 | 1/2017 | Cerny |
| 9,677,501 | B2 | 6/2017 | Pierluissi et al. |
| 9,759,160 | B2 | 9/2017 | Sankrithi et al. |
| 9,845,768 | B2 | 12/2017 | Pesyna et al. |
| 9,982,555 | B2 | 5/2018 | Thet et al. |
| 9,995,314 | B2 | 6/2018 | Miller et al. |
| 10,077,660 | B2 | 9/2018 | Hoefer et al. |
| 10,090,676 | B2 | 10/2018 | Knowles et al. |
| 10,126,062 | B2 | 11/2018 | Cerny et al. |
| 10,184,400 | B2 | 12/2019 | Cerny et al. |
| 10,202,865 | B2 | 2/2019 | Breeze-Stringfellow et al. |
| 10,253,648 | B2 | 4/2019 | Bentley et al. |
| 10,260,419 | B2 | 4/2019 | Cerny et al. |
| 10,263,550 | B2 | 4/2019 | Thet et al. |
| 10,344,674 | B2 | 7/2019 | Cerny et al. |
| 10,364,750 | B2 | 7/2019 | Rambo |
| 10,443,436 | B2 | 10/2019 | Miller et al. |
| 10,487,739 | B2 | 11/2019 | Miller et al. |
| 10,644,630 | B2 | 5/2020 | Smith et al. |
| 10,787,996 | B2 | 9/2020 | Kupratis et al. |
| 2004/0197187 | A1 | 10/2004 | Usab et al. |
| 2004/0234372 | A1 | 11/2004 | Shahpar |
| 2005/0109012 | A1 | 5/2005 | Johnson |
| 2005/0241292 | A1 | 11/2005 | Taylor et al. |
| 2007/0186535 | A1 | 8/2007 | Powell et al. |
| 2007/0251212 | A1 | 11/2007 | Tester |
| 2009/0078819 | A1 | 3/2009 | Guering et al. |
| 2009/0090096 | A1 | 4/2009 | Sheridan |
| 2010/0014977 | A1 | 1/2010 | Shattuck |
| 2010/0111674 | A1 | 5/2010 | Sparks |
| 2010/0251726 | A1 | 10/2010 | Jones et al. |
| 2010/0326050 | A1 | 12/2010 | Schilling et al. |
| 2010/0329856 | A1 | 12/2010 | Hofer et al. |
| 2011/0150659 | A1 | 6/2011 | Micheli et al. |
| 2011/0192166 | A1 | 8/2011 | Mulcaire |
| 2012/0177493 | A1 | 7/2012 | Fabre |
| 2013/0098050 | A1 | 4/2013 | Kupratis |
| 2013/0104521 | A1 | 5/2013 | Kupratis |
| 2013/0104522 | A1 | 5/2013 | Kupratis |
| 2013/0104560 | A1 | 5/2013 | Kupratis |
| 2014/0133982 | A1 | 5/2014 | Dejeu et al. |
| 2014/0345253 | A1 | 11/2014 | Dawson et al. |
| 2014/0345254 | A1 | 11/2014 | Dawson et al. |
| 2015/0003993 | A1 | 1/2015 | Kim et al. |
| 2015/0098813 | A1 | 4/2015 | Jarrett, Jr. |
| 2015/0121893 | A1 | 5/2015 | Kupratis |
| 2015/0284070 | A1 | 10/2015 | Breeze-Stringfellow et al. |
| 2015/0291276 | A1 | 10/2015 | Zatorski et al. |
| 2016/0010487 | A1 | 1/2016 | Breeze-Stringfellow et al. |
| 2016/0053692 | A1 | 2/2016 | Izquierdo |
| 2016/0090863 | A1 | 3/2016 | Diaz et al. |
| 2016/0160647 | A1 | 6/2016 | Hofer et al. |
| 2016/0230658 | A1 | 8/2016 | Hanlon et al. |
| 2016/0298550 | A1 | 10/2016 | Kupratis et al. |
| 2016/0333734 | A1 | 11/2016 | Bowden et al. |
| 2016/0347463 | A1 | 12/2016 | Negulescu |
| 2017/0051678 | A1 | 2/2017 | Becker, Jr. |
| 2017/0051680 | A1 | 2/2017 | Becker, Jr. et al. |
| 2017/0102006 | A1 | 4/2017 | Miller et al. |
| 2017/0114721 | A1 | 4/2017 | Miller et al. |
| 2017/0167382 | A1 | 6/2017 | Miller et al. |
| 2017/0184027 | A1 | 6/2017 | Moniz et al. |
| 2017/0198719 | A1 | 7/2017 | Cerny et al. |
| 2018/0065727 | A1 | 3/2018 | Gruber et al. |
| 2018/0118364 | A1 | 5/2018 | Golshany et al. |
| 2018/0215475 | A1 | 8/2018 | Hurt et al. |
| 2018/0283795 | A1 | 10/2018 | Cerny et al. |
| 2019/0136710 | A1 | 5/2019 | Breeze-Stringfellow et al. |
| 2019/0153952 | A1 | 5/2019 | Niergarth et al. |
| 2019/0153953 | A1 | 5/2019 | Niergarth et al. |
| 2019/0218971 | A1 | 7/2019 | Niergarth et al. |
| 2019/0249599 | A1 | 8/2019 | Sen et al. |
| 2019/0257247 | A1 | 8/2019 | Pal et al. |
| 2019/0360401 | A1 | 11/2019 | Rambo et al. |
| 2020/0025109 | A1 | 1/2020 | Stieger et al. |
| 2020/0095939 | A1 | 3/2020 | Epstein |
| 2020/0116104 | A1 | 4/2020 | Levisse et al. |
| 2020/0332718 | A1 | 10/2020 | Rambo |
| 2021/0108573 | A1 | 4/2021 | Sibbach et al. |
| 2021/0108595 | A1 | 4/2021 | Khalid et al. |
| 2021/0108597 | A1 | 4/2021 | Ostdiek et al. |
| 2022/0042463 | A1 | 2/2022 | Molesini et al. |
| 2022/0056811 | A1 | 2/2022 | Molesini et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |

(56)  References Cited

FOREIGN PATENT DOCUMENTS

| | | | |
|---|---|---|---|
| GB | 2100799 | A | 1/1983 |
| GB | 2196390 | A | 4/1988 |
| GB | 2461811 | A | 1/2010 |
| JP | H0370698 | A | 3/1991 |
| JP | 2006123880 | A | 5/2006 |
| JP | 2009508748 | A | 3/2009 |
| JP | 2011527263 | A | 10/2011 |
| KR | 101179277 | B1 | 9/2012 |
| WO | WO2004/033295 | A1 | 4/2004 |
| WO | WO2005/111413 | A1 | 11/2005 |
| WO | WO2011/020458 | A2 | 2/2011 |
| WO | WO2011/094477 | A2 | 8/2011 |
| WO | WO2011/107320 | A1 | 9/2011 |
| WO | WO2014/143248 | A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org.document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference And Exhibit, Jul. 6-8, 1992, Nashville TN, pp. 1-9.

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|---|---|---|---|---|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|-------|------|------|------|------|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|---|---|---|---|---|
| 5.205 | 70.4 | 6.24 | 0.25 | 0.60 |
| 4.245 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

GAS TURBINE ENGINE WITH THIRD STREAM

CROSS-REFERENCE TO RELATED APPLICATIONS

This application is a continuation in part application of U.S. application Ser. No. 18/888,873, filed Sep. 18, 2024, which is a continuation in part application of U.S. application Ser. No. 18/675,270, filed May 28, 2024, which is a continuation application of U.S. application Ser. No. 17/879,384 filed Aug. 2, 2022. Each of these applications is hereby incorporated by reference in their entireties.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
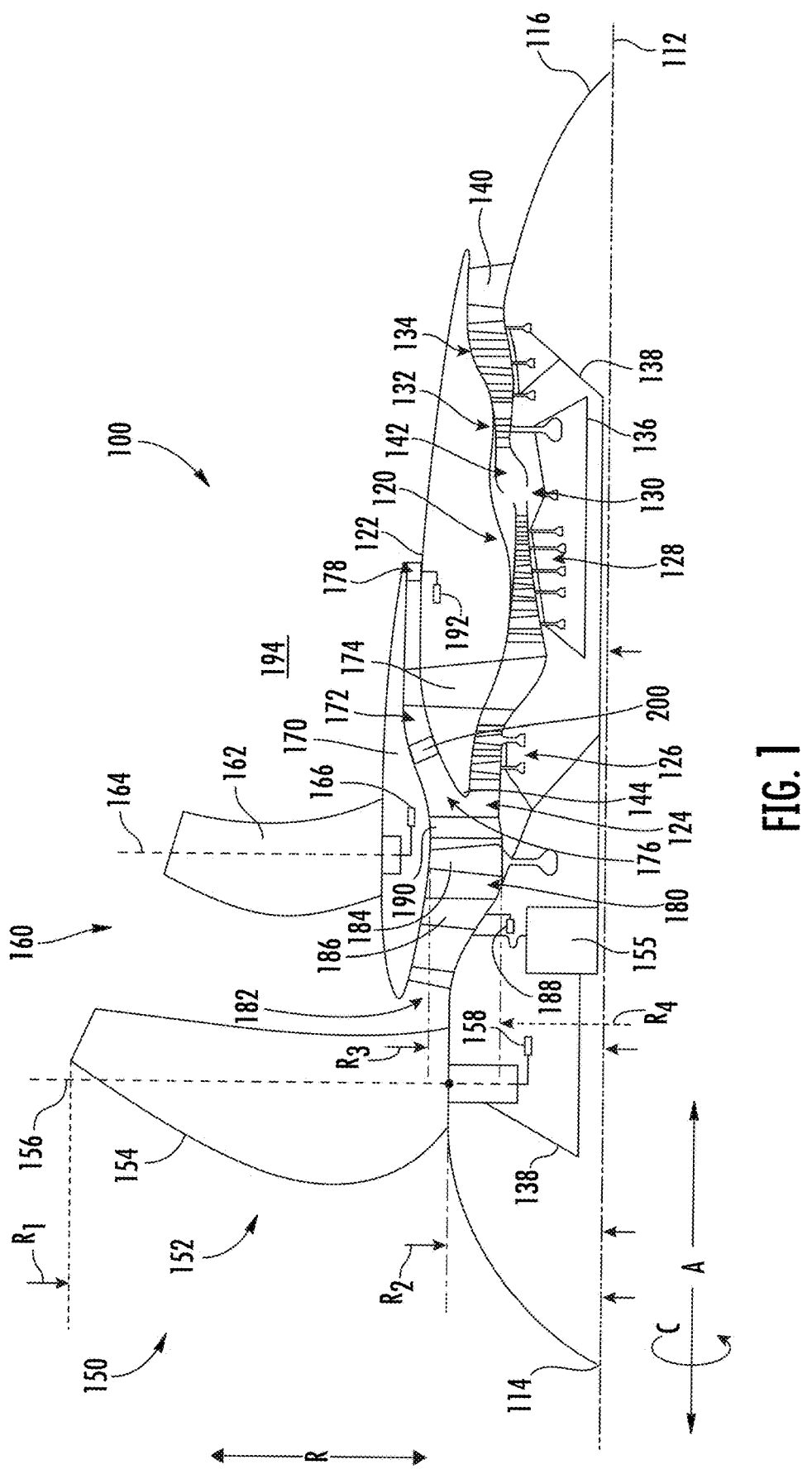
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, an aeronautical gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration, sometimes referred to as a turbofan engine configuration, may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiency for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an "unducted gas turbine engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_4$ divided by $R_3$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
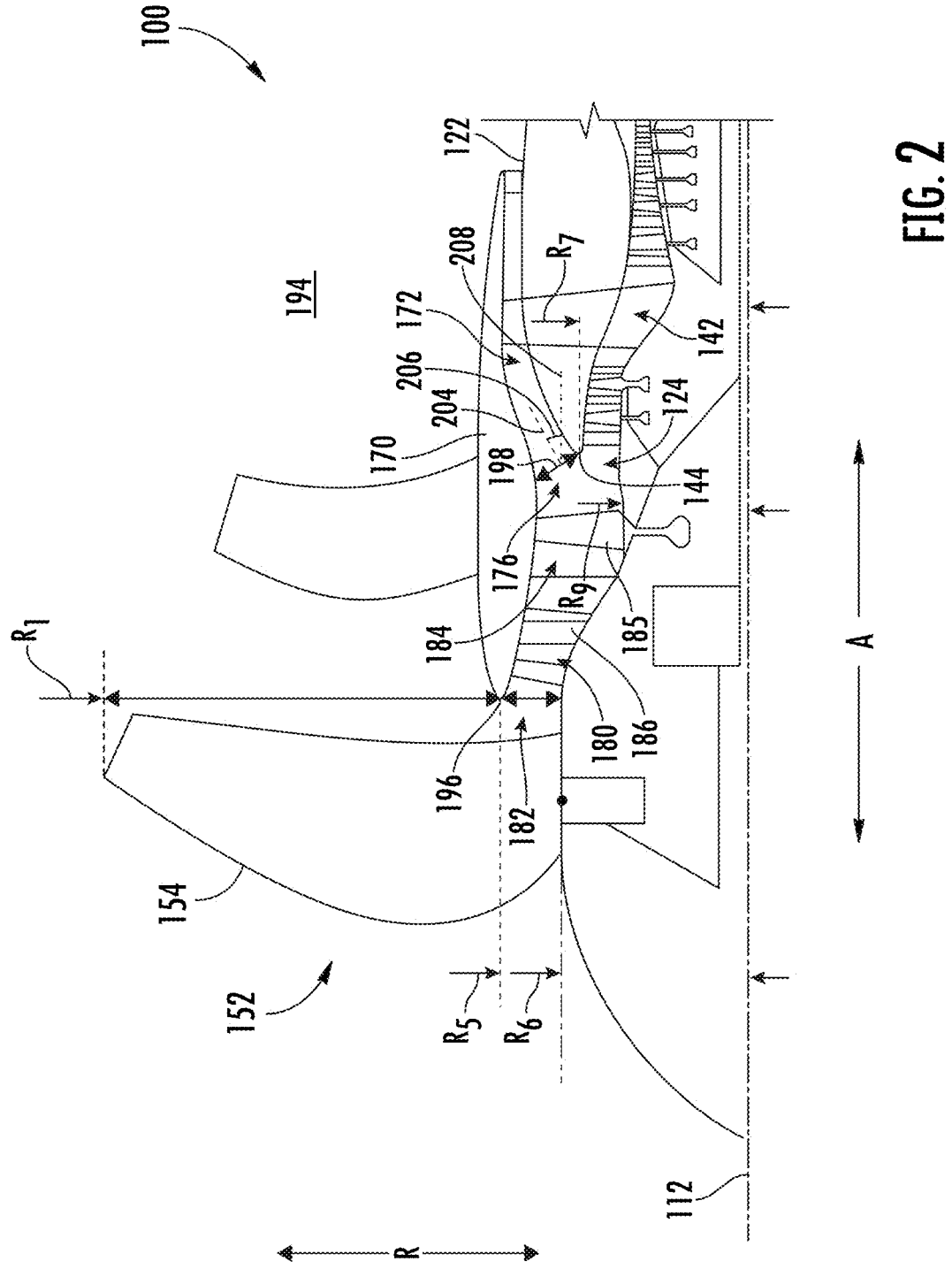
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above, includes a primary fan, or rather fan 152 having fan blades 154, and a secondary fan, or rather ducted fan 184 having fan blades 185. Airflow from the fan 152 is split between a bypass region 194 (as defined below) and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
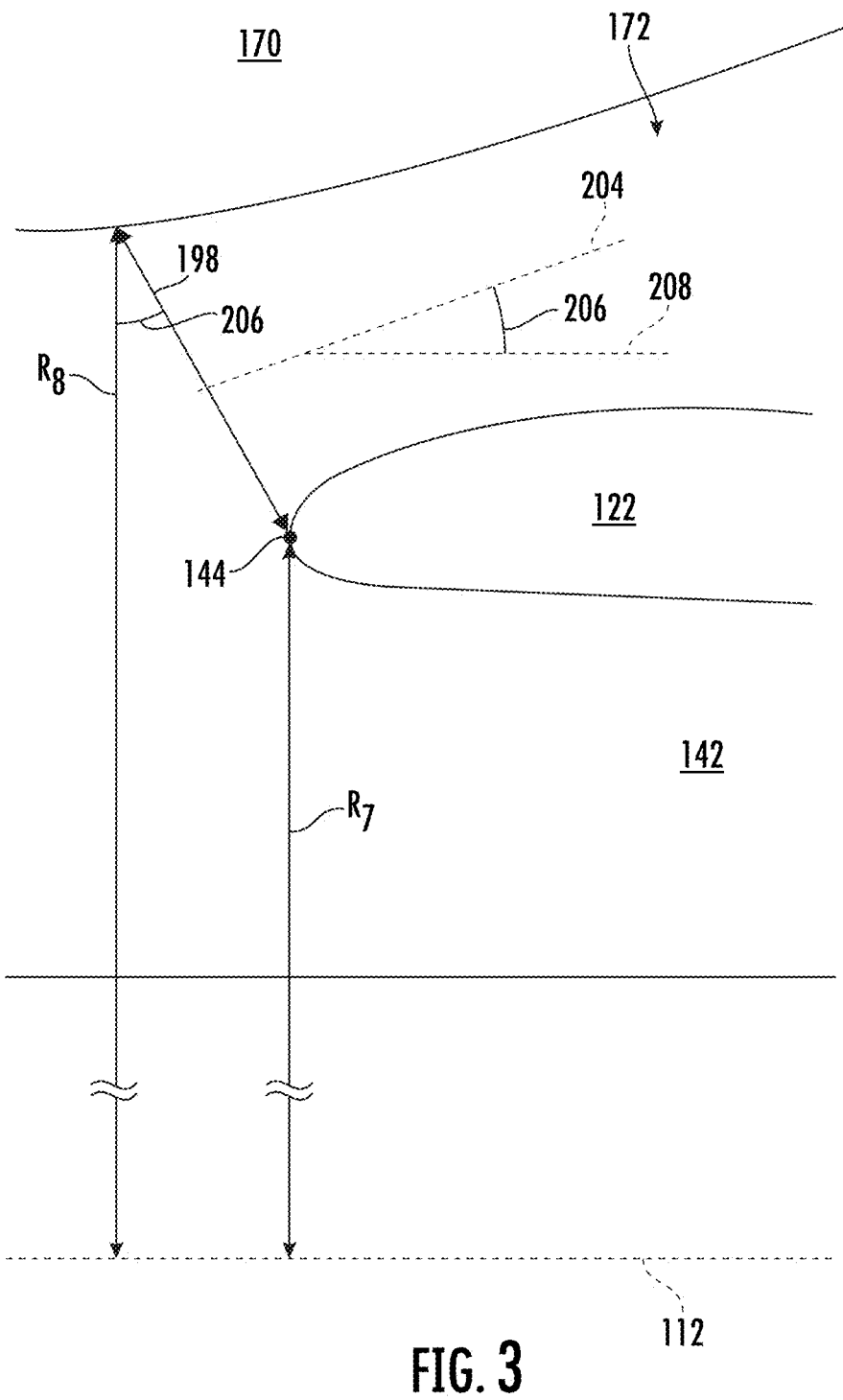
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi(R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula: $\pi R_7^2 - \pi R_9^2$.

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 and through the fan duct 172 to an airflow through the core duct 142. The bypass passage (not separately labeled) is located within the bypass region 194 and refers to a passage where airflow from the fan 152 passes over the inlet duct 180. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the fan 152, a rotational speed of the fan 152, or both while the engine is operating at the rated speed during standard day operating conditions, and the primary fan outer fan area, $A_{P\_Out}$. The amount of airflow through the inlet duct 180 can be determined using a fan pressure ratio for the fan 152, a rotational speed of the fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the ducted fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., both ducted and unducted gas turbine engines and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \tag{1}$$

$$CBR = A_{3S}/A_C \tag{2}$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Referring now to FIGS. 4A through 4H and 5A through 5D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5D. FIGS. 5A through 5D are plots of gas turbine engines in accordance with one or more exemplary embodiments of the present disclosure, showing the TPAR (Y-Axis) and the CBR (X-axis). FIGS. 5A through 5D highlight preferred subranges, including subranges for unducted engines, ducted engines, and turboprop engines, as discussed hereinbelow.

Figure 5A:
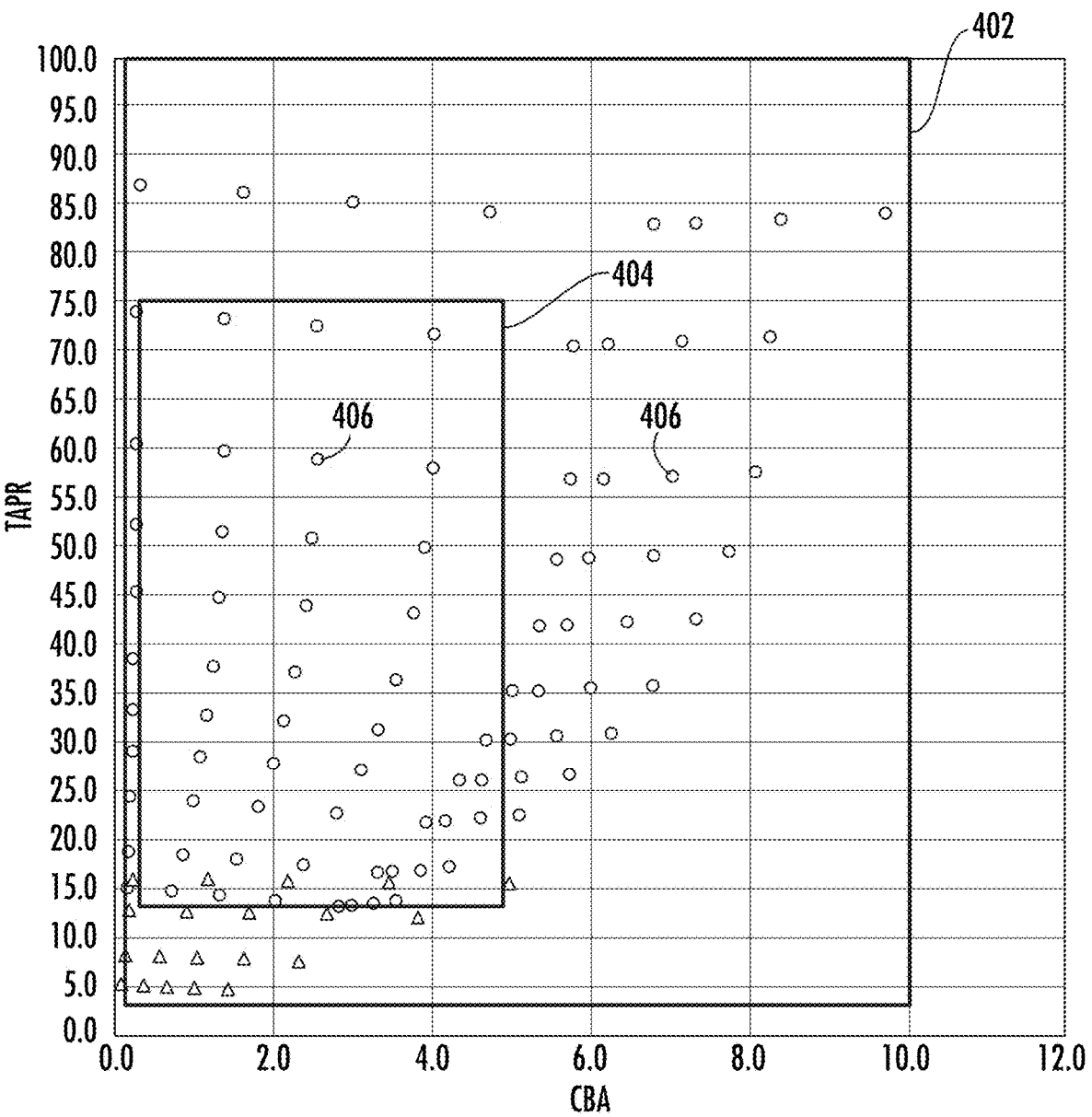
FIGS. 5A through 5D are graphs depicting a range of thrust to power airflow ratios and core bypass ratios in accordance with various example embodiments of the present disclosure.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted gas turbine engines, ducted gas turbine engines (turbofan engines), and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
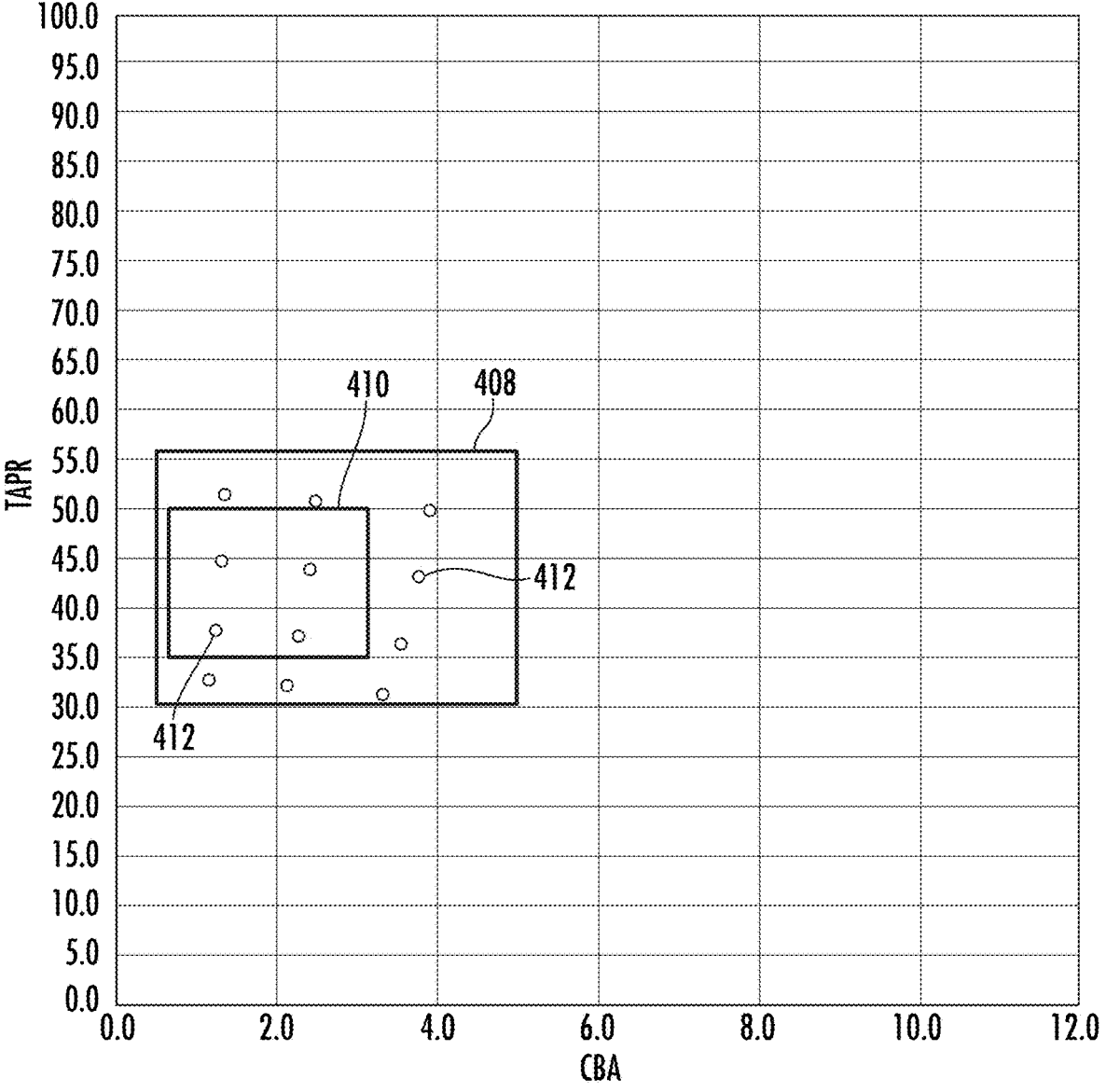

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
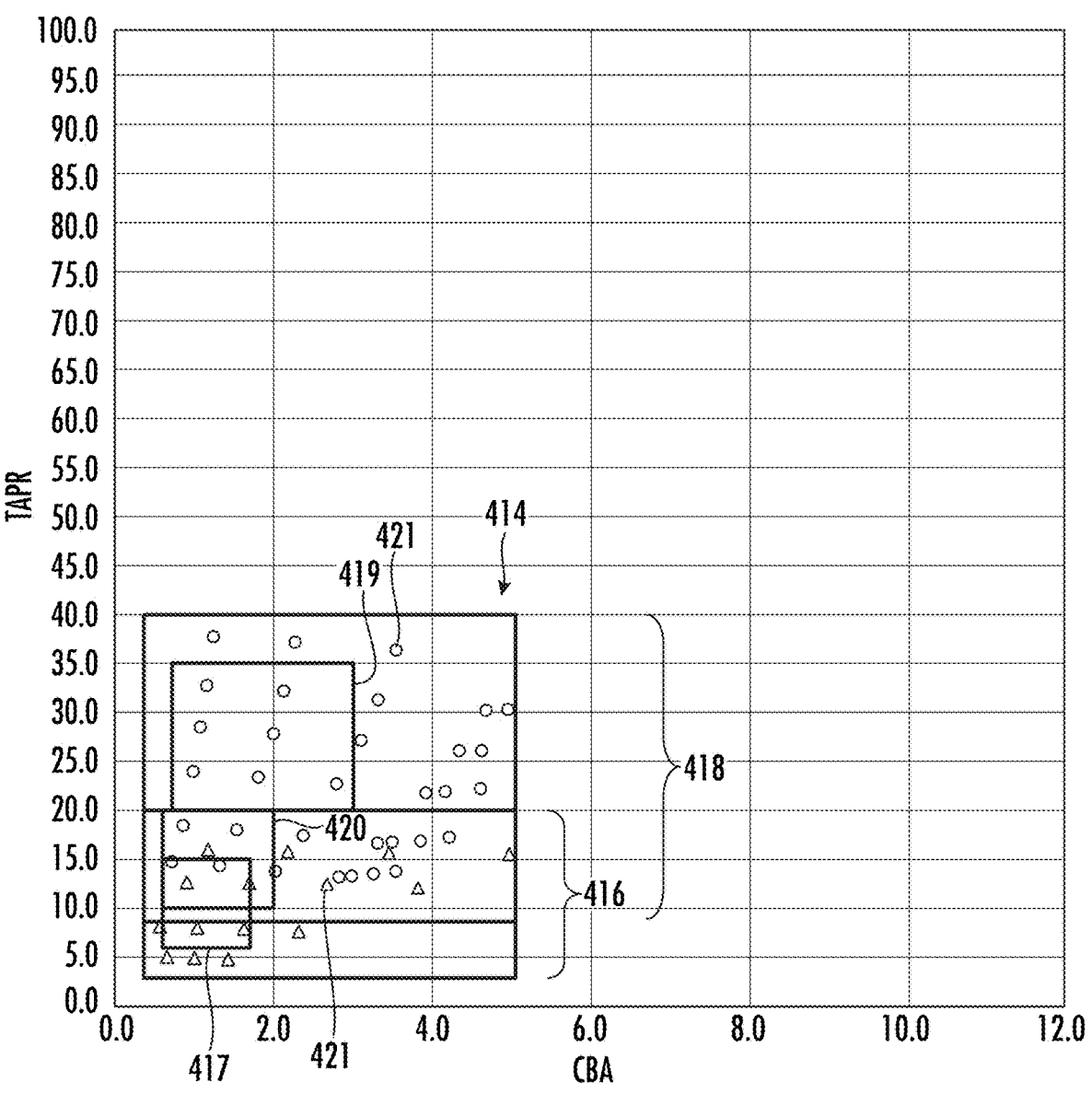

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine, a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine, a primary fan may be larger as compared to a ducted, direct drive gas turbine engine, allowing for a larger TPAR. TPAR is, in turn, limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a reasonable manner, and balancing installation and thermal load considerations.

Figure 5D:
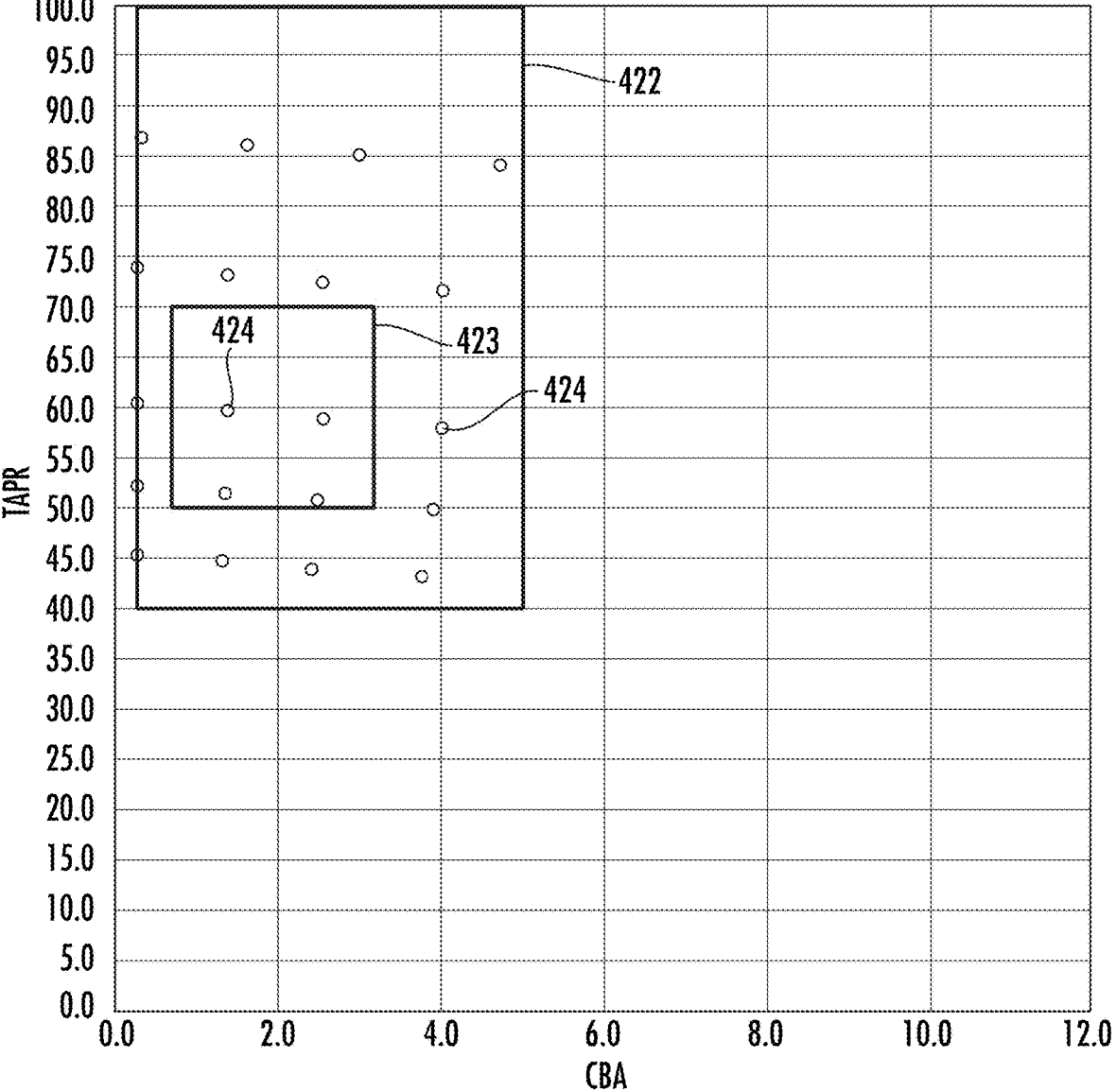

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
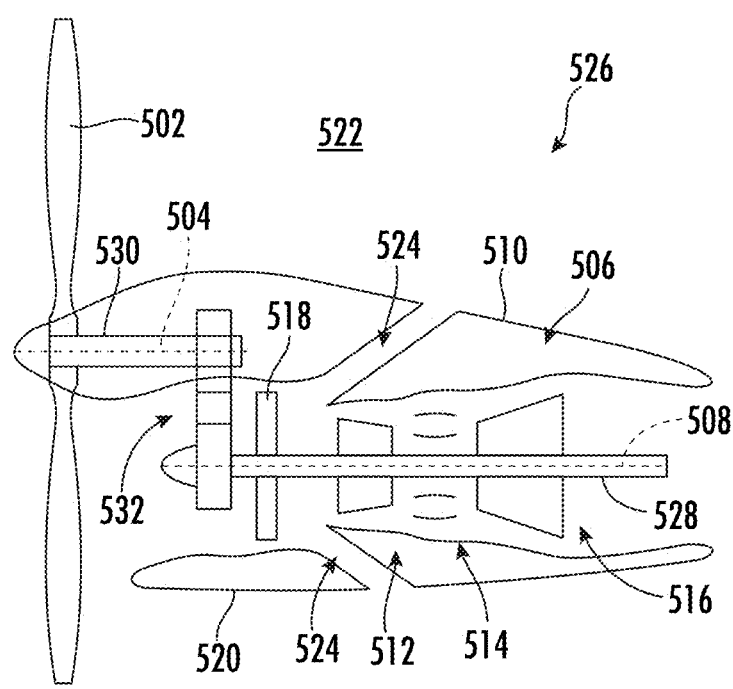
FIG. 6 is a schematic view of a turboprop engine in accordance with an exemplary aspect of the present disclosure.
Figure 7:
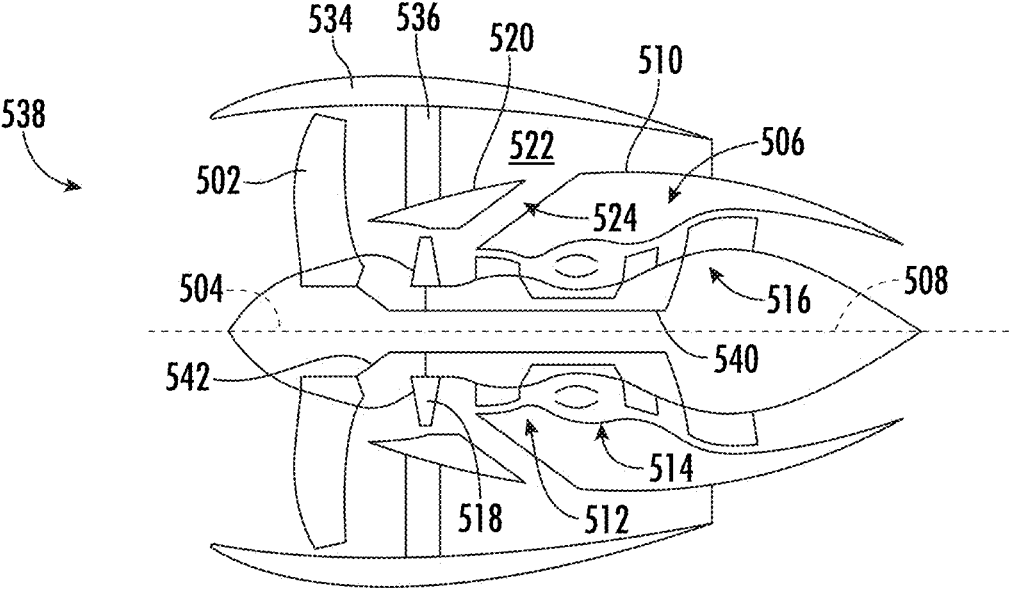
FIG. 7 is a schematic view of a direct drive, ducted, turbofan engine in accordance with an exemplary aspect of the present disclosure.
Figure 8:
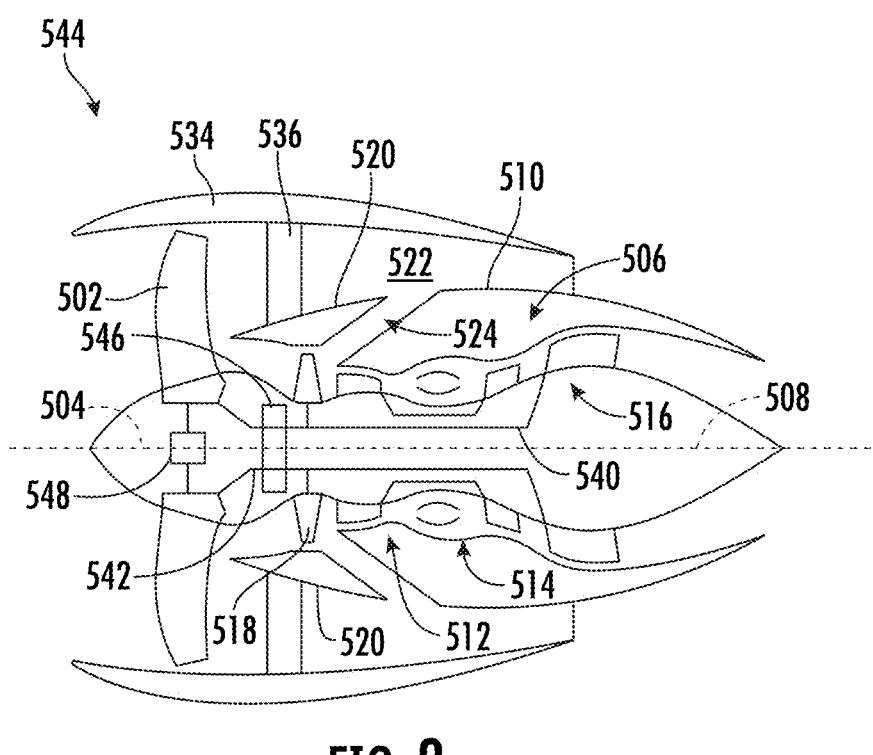
FIG. 8 is a schematic view of a geared, ducted, turbofan engine in accordance with an exemplary aspect of the present disclosure.
Figure 9:
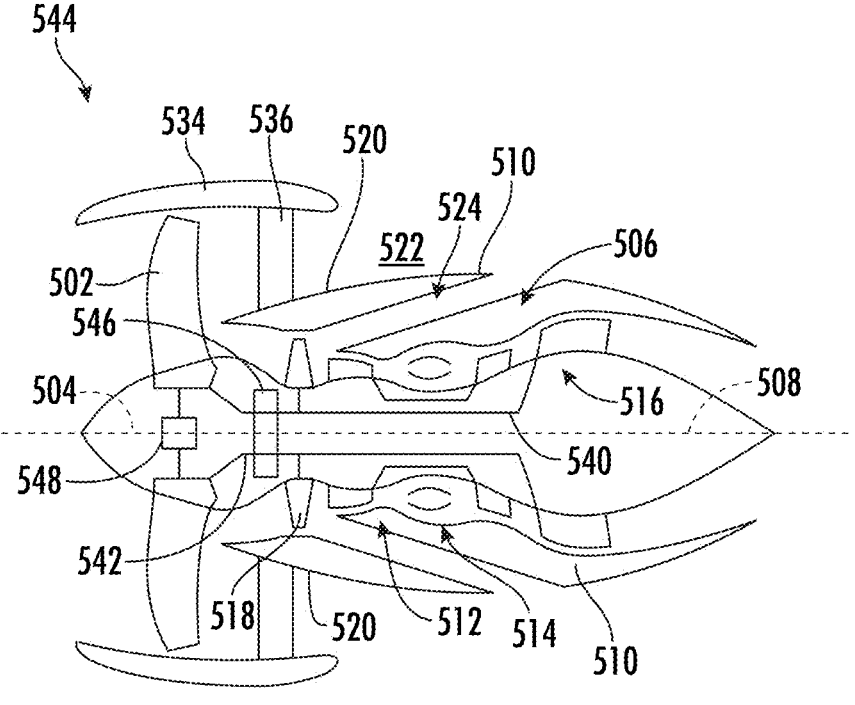
FIG. 9 is a schematic view of a geared, ducted, turbofan engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 12, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, turbofan engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
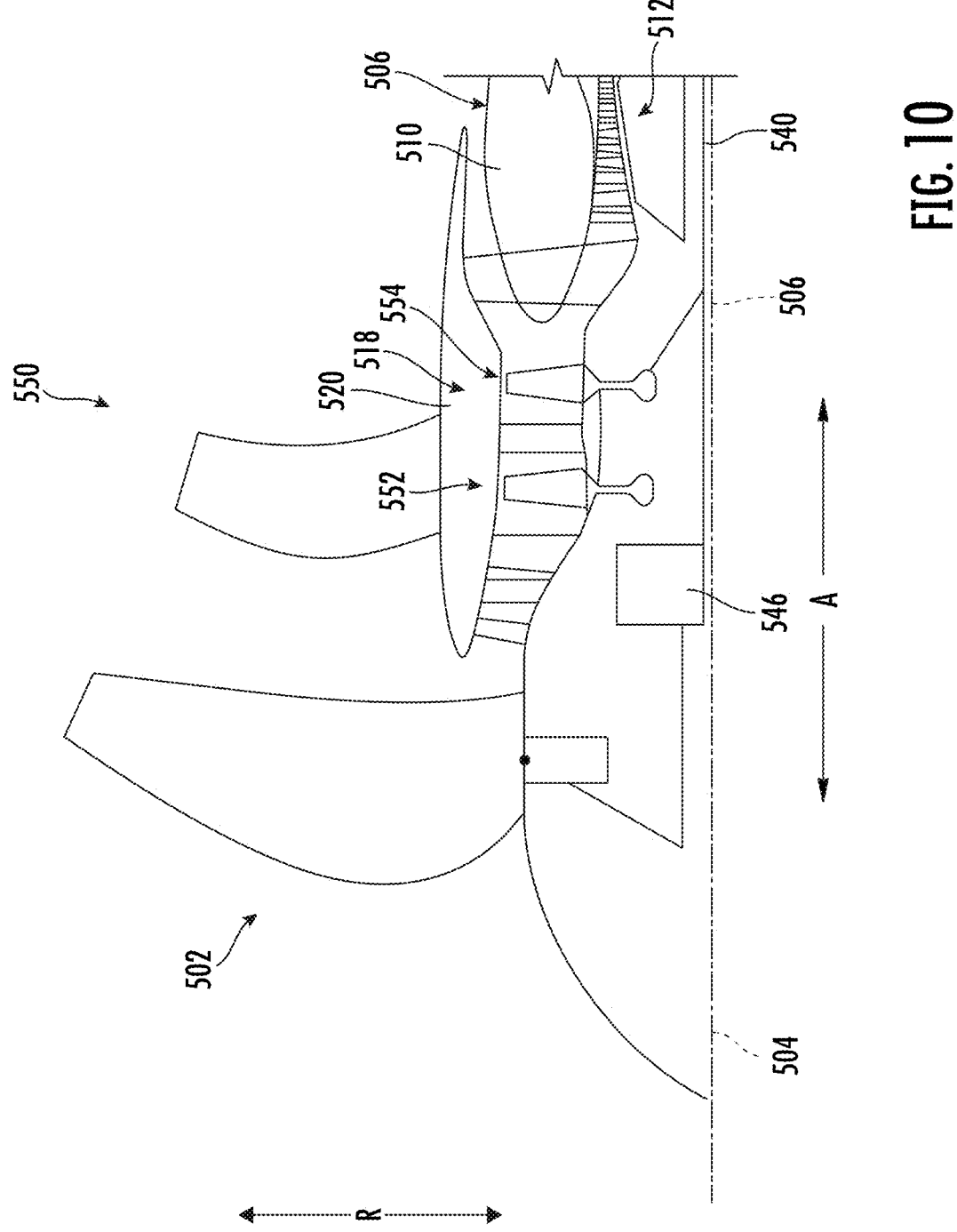
FIG. 10 is a schematic view of an unducted gas turbine engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an unducted gas turbine engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Additionally, in still other exemplary embodiments, the gas turbine engine may have other configurations. For example, referring now to FIG. 11, a gas turbine engine in accordance with yet another exemplary embodiment of the present disclosure is provided. The exemplary gas turbine engine of FIG. 11 may be configured in a similar manner as the exemplary gas turbine engines described above with reference to, e.g., FIGS. 1 through 3.

Figure 11:
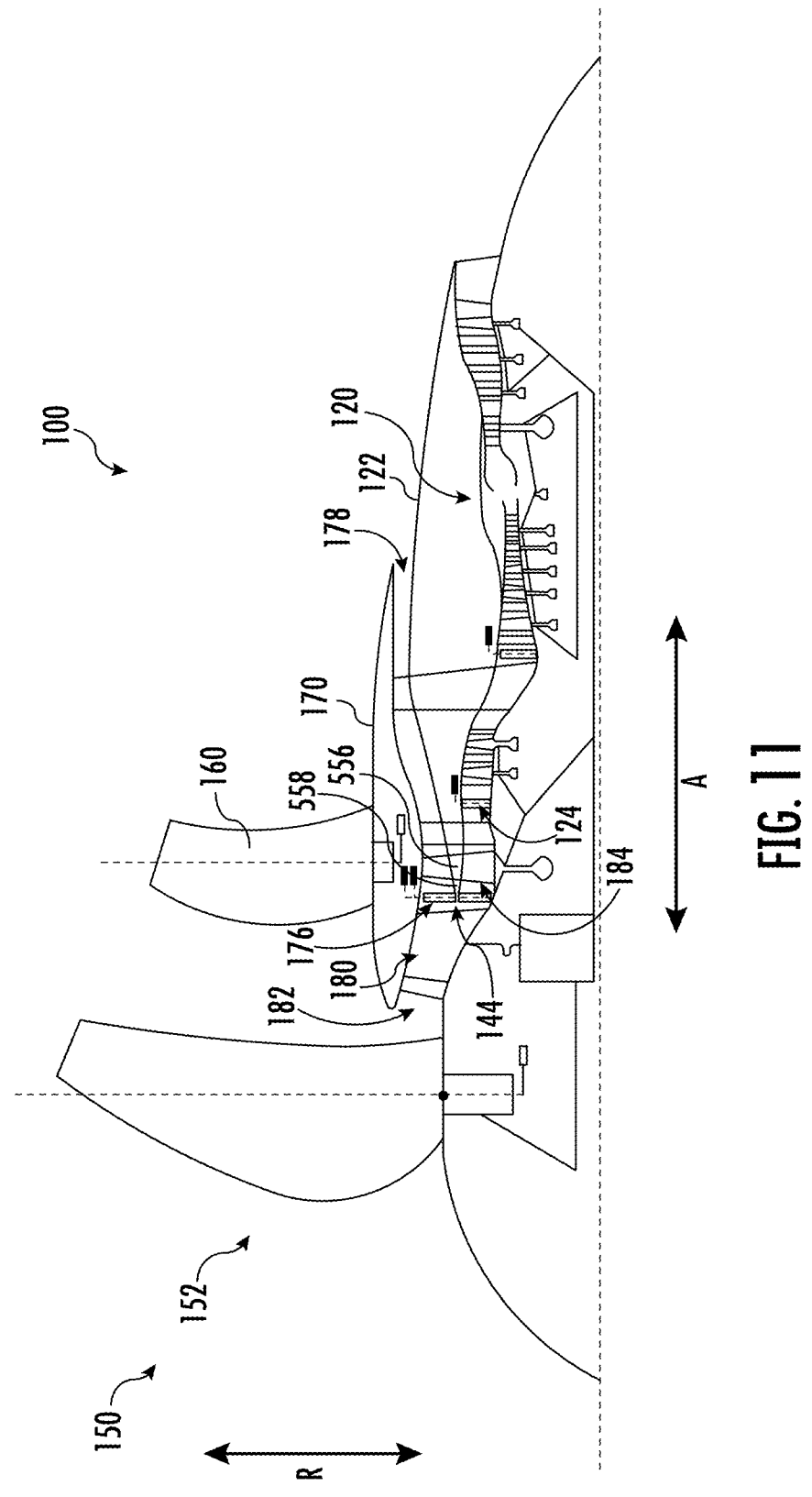
FIG. 11 is a schematic view of an unducted gas turbine engine in accordance with yet another exemplary aspect of the present disclosure.

For example, the exemplary gas turbine engine of FIG. 11 includes a turbomachine 120 and a rotor assembly, also referred to a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

The engine 100 also defines an inlet duct 180. The inlet duct 180 extends between an engine inlet 182 and a core inlet 124. The engine inlet 182 is defined generally at the forward end of the fan cowl 170 and is positioned between a fan 152 of the fan section 150 and a fan guide vane array 160 along the axial direction A. The engine 100 further includes a ducted fan 184 with a plurality of fan blades located at least partially in the inlet duct 180.

However, for the embodiment of FIG. 11, the core cowl 122 carries forward to an aft edge of the fan blades of the ducted fan 184 and the fan blades themselves include an integral splitter 556. This may be termed a blade-on-blade configuration where inner and outer blades are effectively superimposed upon one another and may be unitarily formed or otherwise fabricated to achieve the split between streams.

The core cowl 122 further includes a section 558 extending forward past the fan blades of the ducted fan 184, such that the leading edge 144 is located forward of the fan blades of the ducted fan 184. With such an arrangement, the fan duct inlet 176 is also located forward of the fan blades of the ducted fan 184, and an outer portion of the fan blades along the radial direction R is positioned within the fan duct 172. With this configuration, a secondary fan outer fan area, $A_{S\_Out}$, may be calculated at the fan duct inlet 176 in the same manner discussed above with reference to, e.g., FIGS. 2 and 3.

Further, with such a configuration, the secondary fan inner fan area, $A_{S\_In}$, still refers to an area defined by an annulus representing a portion of the ducted fan 184 located inward of the leading edge 144 of the core cowl 122. However, a calculation of the secondary fan inner fan area, $A_{S\_In}$, is based on a leading edge radius, $R_7$, of the leading edge 144 and an inner fan duct radius, defined along the radial direction R, directly inward along the radial direction R from the leading edge 144 (and not a core inlet inner radius at the core inlet 124).

Further, still, in other exemplary embodiments, other engine configurations may be provided. For example, referring now to FIG. 12, an engine 100 in accordance with another embodiment of the present disclosure is provided. The engine 100 of FIG. 12 may be configured in a similar manner as the exemplary engine 100 of, e.g., FIGS. 1 through 3.

Figure 12:
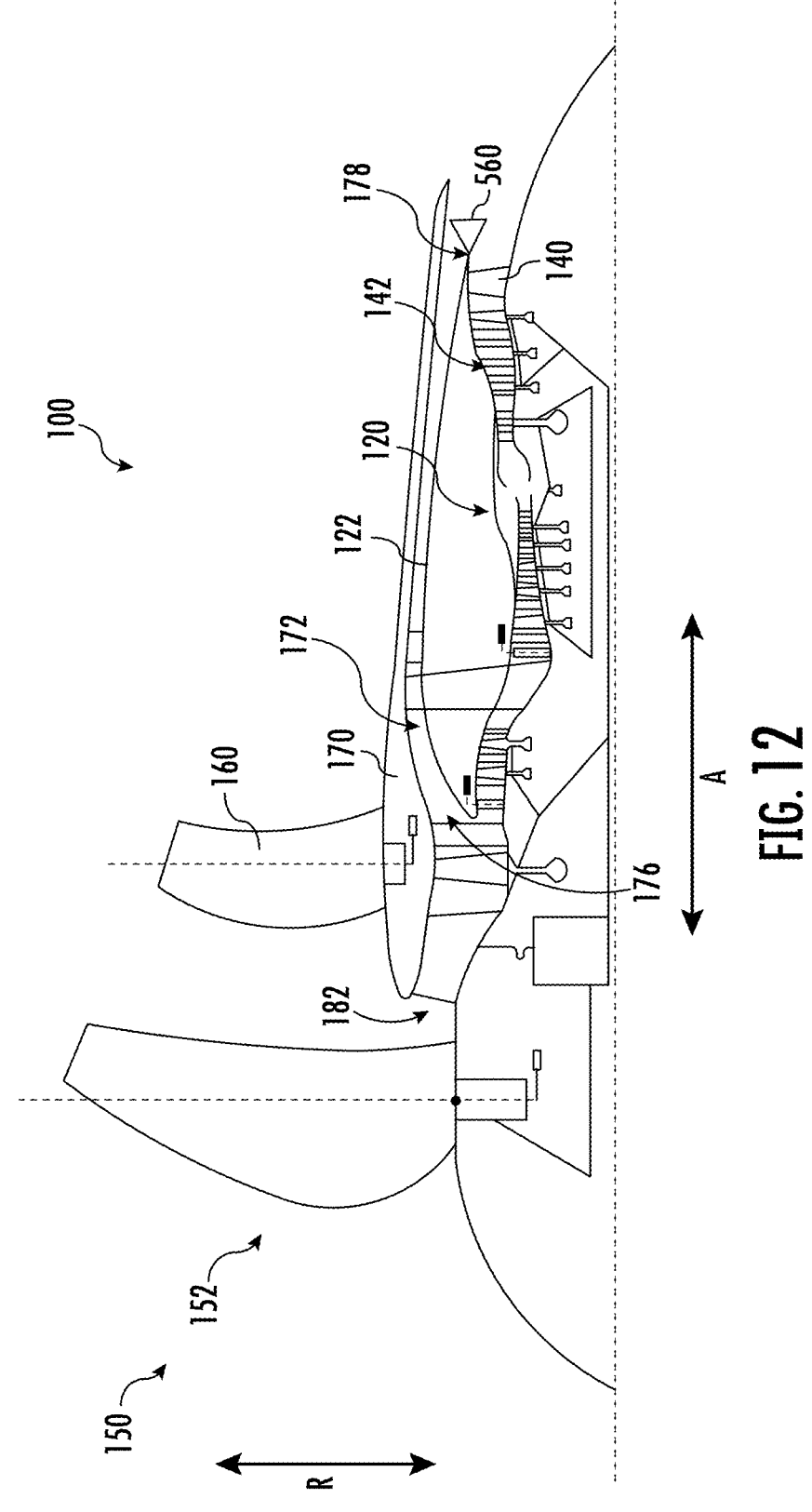
FIG. 12 is a schematic view of an unducted gas turbine engine in accordance with still another exemplary aspect of the present disclosure.

For example, the exemplary gas turbine engine of FIG. 12 includes a turbomachine 120 and a rotor assembly, also referred to a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

However, for the embodiment of FIG. 12, the fan duct 172 of the exemplary engine 100 is an elongated fan duct 172 extending between the fan cowl 170 and the core cowl 122, a full length of the core cowl 122. With such a configuration, the fan exhaust nozzle 178 is downstream of an exhaust nozzle 140 of the turbomachine 120. The engine 100 of FIG. 12 further includes a mixing device 560 in the region aft of the exhaust nozzle 140 to aid in mixing airflow from the fan duct 172 and from a working gas flowpath 142 of the turbomachine 120, e.g., to improve acoustic performance by directing airflow from the working gas flowpath 142 of the turbomachine 120 outward and from the fan duct 172 inward. Mixing in such a manner may improve performance and noise emissions.

Moreover, in other exemplary embodiments of the present disclosure, a gas turbine engine may have still other suitable configurations. For example, in other embodiments, the gas turbine engine may include any suitable number of shafts or spools, compressors, or turbines (e.g., the gas turbine engine may be a three-spool engine having three turbines and associated spools).

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 12. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2, 11, and 12), a turboprop engine (see FIG. 6), or a ducted turbofan engine (see FIGS. 7 through 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

As will further be appreciated, embodiments of the present disclosure vary an effective flow area of a fan duct of a three-stream gas turbine engine to enable an increase or decrease in a flow of air through the fan duct. For example, at certain operating conditions of the three-stream gas turbine engine, such as during cruise, the fan duct has a first defined outlet area. However, at other operating conditions, the exit area for the fan duct may be partially increased or fully increased. For example at a higher power operating conditions, such as takeoff, the exit area may be partially increased, and at a lower power operating condition, at an idle operation, or both, the exit area may be fully increased. Thus, embodiments of the present disclosure enable variable control of the flow or exit areas of the fan duct to adjust the flow path for the third stream.

Notably, incorporating such a variable exit area in a fan duct of a three-stream gas turbine engine defining a core bypass ratio and thrust to power airflow ratio, as described above, can provide for a more desirable amount of airflow through the fan duct, relative to an amount of airflow through a core and through a bypass passage of the three-stream gas turbine engine, with less risk of creating a stall operation throughout the flight envelope, with less need to bleed excess airflow in the engine during certain operating conditions, or both. In such a manner, the combined features of the three-stream gas turbine engine can synergistically work together to provide an overall improved three-stream gas turbine engine.

In particular, as will be explained in more detail below, embodiments of the present disclosure also vary the effective flow area of the fan duct 172 to enable an increase or decrease in a flow of air as the third stream 524 through the fan duct 172. In other words, exemplary embodiments of the present disclosure provide one or more variable mechanisms to increase or vary exit areas for the third stream 524 from the fan duct 172. Embodiments of the present disclosure are configured to automatically control the third stream 524 exit areas to balance performance and operability of the gas turbine engine 100. Embodiments of the present disclosure may be incorporated into the gas turbine engine 100 and/or the outer nacelle 534 structure. In exemplary embodiments, the present disclosure provides one or more additional or secondary exit areas from the fan duct in addition to the primary exit area at the aft-most exit of the fan duct 172. Embodiments of the present disclosure include one or more mechanisms to vary an exit area of the fan duct proximate to the aft-most exit of the fan duct 172. In exemplary embodiments, actuation of the exit area varying mechanisms may be automatically controlled. In exemplary embodiments, at certain operating conditions of the gas turbine 100 or an aircraft incorporating the gas turbine engine 100, such as during cruise, the fan duct 172 has a defined outlet area. However, at other operating conditions, the exit areas for the fan duct 172 may be increased such as, not by way of limitation, partially increased or partially open at higher power operating conditions such as takeoff and fully increased or fully open at lower power operating conditions and/or idle operation of the gas turbine 100 or an aircraft incorporating the gas turbine engine 100. Thus, embodiments of the present disclosure enable variable control of the flow or exit areas of the fan duct 172 to adjust the flow path for the third stream 524. Control of the mechanisms to increase or decrease the flow exit areas of the fan duct 172 may be automatic such as, not by way of limitation, based on engine speed or engine pressure levels or may be user-controlled, such as by a pilot of an aircraft or operator of the gas turbine engine 100. Embodiments of the present disclosure provide one or more adjustment mechanisms upstream or at the aft-most end of the fan duct 172 to vary the effective flow area available to the third stream 524.

Figures 13, 14, 15:
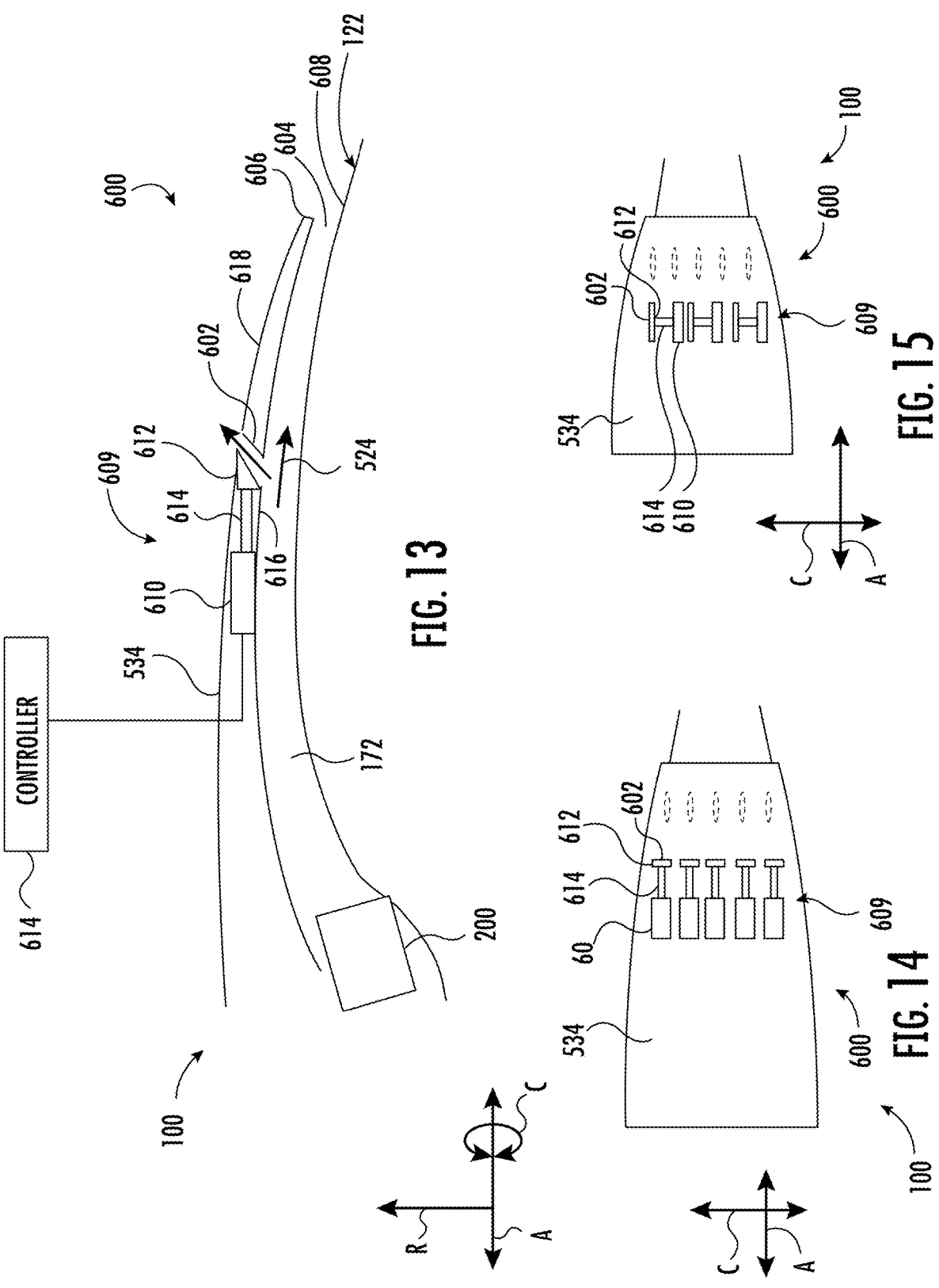
FIG. 13 is a schematic, cross-sectional view of a variable third stream exhaust area system in accordance with an exemplary aspect of the present disclosure.
FIG. 14 is a schematic top, plan view of an exemplary embodiment of the variable third stream exhaust area system of FIG. 13.
FIG. 15 is a schematic top, plan view of an exemplary embodiment of the variable third stream exhaust area system of FIG. 13.

Referring now to FIG. 13, a cross-sectional view of the gas turbine engine 100 is shown with one or more variable third stream exhaust area systems 600. The variable third stream exhaust area systems 600 are configured to vary the effective flow area of the fan duct 172 to enable an increase or decrease in a flow of air through the fan duct 172. In other words, exemplary embodiments of the variable third stream exhaust area system 600 are configured to provide additional outlets or exit areas for an air flow flowing through the fan duct 172 and/or provide an increase or decrease in an area of one or more outlets or exit areas of the fan duct 172 to accommodate variable control of the third stream 524 flowing through the fan duct 172. In exemplary embodiments, the variable third stream exhaust area system 600 is located downstream of the heat exchanger 200.

In the illustrated embodiment of FIG. 13, the variable third stream exhaust area system 600 includes one or more bleed passageways 602 fluidly connected to the fan duct 172 to enable at least a portion of the third stream 524 to exit the fan duct 172 upstream of a fan duct exhaust nozzle 604. In other words, the one or more bleed passageways 602 form one or more additional exit areas for the third stream 524 to exit the fan duct 172 and enabling an increase flow of the third stream 524 into or though the fan duct 172. In exemplary embodiments, the fan duct exhaust nozzle 604 is an aft-most exhaust or discharge port for the fan duct 172. In the illustrated embodiment of FIG. 13, the fan duct exhaust nozzle 604 is defined at least partially by a trailing edge 606 of the outer nacelle 534 and a radially outer surface 608 of the core cowl 122. However, it should be understood that the fan duct exhaust nozzle 604 may located or defined by other structures such as depicted in FIGS. 6-9.

In the illustrated embodiment of FIG. 13, the variable third stream exhaust area system 600 includes one or more actuation devices 609 disposed downstream of the heat exchanger 200 to open and close the one or more bleed passageways 602. In exemplary embodiments, the one or more actuation devices 609 include one or more actuators 610 coupled to one or more dams 612 via one or more rods 614. The actuator 610 is actuable to axially move the dam 612 to an open position (as depicted in FIG. 13) or a closed position to respectively open or close the bleed passageway 602. The dam 612 may be an annular dam 612 movable with respect to one or more bleed passageways 602 or may extend semi-annularly or for a particular circumferential span. It should be understood that the dam 612 may also be positioned between a fully open position and a fully closed position to have the bleed passageway 602 partially open. In the illustrated embodiment, forward axial movement of the dam 612 opens the bleed passageway 602 and aft axial movement of the dam 612 closes the bleed passageway 602. In the illustrated embodiment, the bleed passageway 602 extends radially outward from a radially inward surface 616 of the outer nacelle 534 to a radially outward surface 618 of the outer nacelle 534 and is angled in a radially outward and aft direction. In the illustrated embodiment, the one or more actuation devices 609 are located at least partially within the outer nacelle 534 such that at least a portion of the third stream 524 flow into and/or through the outer nacelle 534 via the one or more bleed passageways 602. In exemplary embodiments, the one or more actuators 610 may be communicatively coupled to one or more controllers 619 to automatically control the actuation of the one or more actuators 610 and the corresponding movement of the one or more dams 612. The controller 619 may be a stand-alone controller, dedicated to the downstream locations and/or systems, or alternatively, may be incorporated into one or more of a main system controller for an aircraft incorporating therein the gas turbine engine 100 (such as a full authority digital engine control system, also referred to as a FADEC), etc. The controller 619 may be configured similar to exemplary computing devices of the computing system 800 described below with reference to FIG. 29.

FIGS. 14 and 15 are schematic top plan views of an embodiment of the variable third stream exhaust area system 600 of FIG. 13 with at least a portion of the outer nacelle 534 not shown to better depict the components of the variable third stream exhaust area system 600. In FIGS. 14 and 15, a series or plurality of bleed passageways 602, actuators 610, rods 614, and dams 612 are located spaced apart from each other circumferentially. In FIG. 14, the bleed passageways 602 have a slot-like shape with a longer dimensional aspect extending in the circumferential direction. In FIG. 14, the actuators 610 and rods 614 are positioned to provide axial movement of the dams 612 to open or close the bleed passageways 602. In FIG. 15, the bleed passageways 602 have a slot-like shape with a longer dimensional aspect extending in the axial direction. In FIG. 15, the actuators 610 and rods 614 are positioned to provide circumferential movement of the dams 612 to open or close the bleed passageways 602. It should be understood that the bleed passageways 602 may extend longitudinally in other directions, or combinations of directions, and may be various shapes. Each actuator 610 may be configured for independent actuation or a plurality of actuators 610 may be ganged together such that the bleed passageways 602 may be opened or closed independently, and to open to varying degrees, or a plurality of bleed passageways 602 may be opened or closed in unison, also open to varying degrees, respectively.

Figure 16:
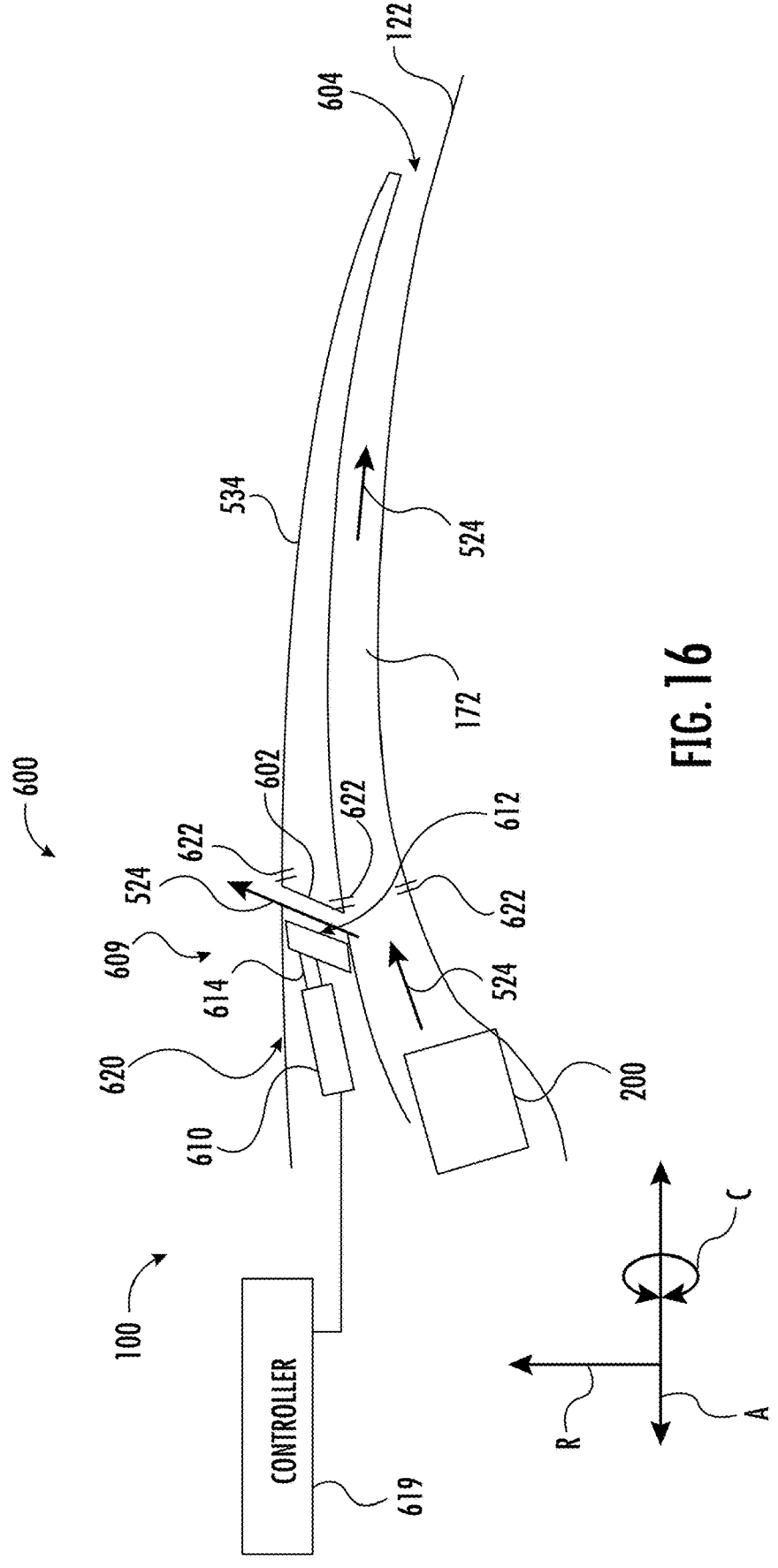
FIG. 16 is a schematic, cross-sectional view of a variable third stream exhaust area system in accordance with an exemplary aspect of the present disclosure.

Referring now to FIG. 16, another embodiment of the variable third stream exhaust area system 600 is schematically depicted. In the illustrated embodiment, the gas turbine engine 100 includes a frame assembly 620 defining one or more interface locations 622 configured to support attachment of the outer nacelle 534 to the gas turbine engine 100. In the illustrated embodiment, the one or more bleed passageways 602 are located upstream of the interface locations 622 with respect to the fan duct 172. In exemplary embodiments, the one or more actuation devices 609 are located upstream of the interface locations 622 and at least partially within the frame assembly 620. In the illustrated embodiment, the one or more bleed passageways 602 extend radially outward from the fan duct 172 and may be configured similarly to the variable third stream exhaust area system 600 depicted and described in connection with FIGS. 12-14. In exemplary embodiments, the one or more actuators 610 are communicatively coupled to the one or more controllers 619 to enable automatic control or actuation of the one or more actuators 610.

Figure 17:
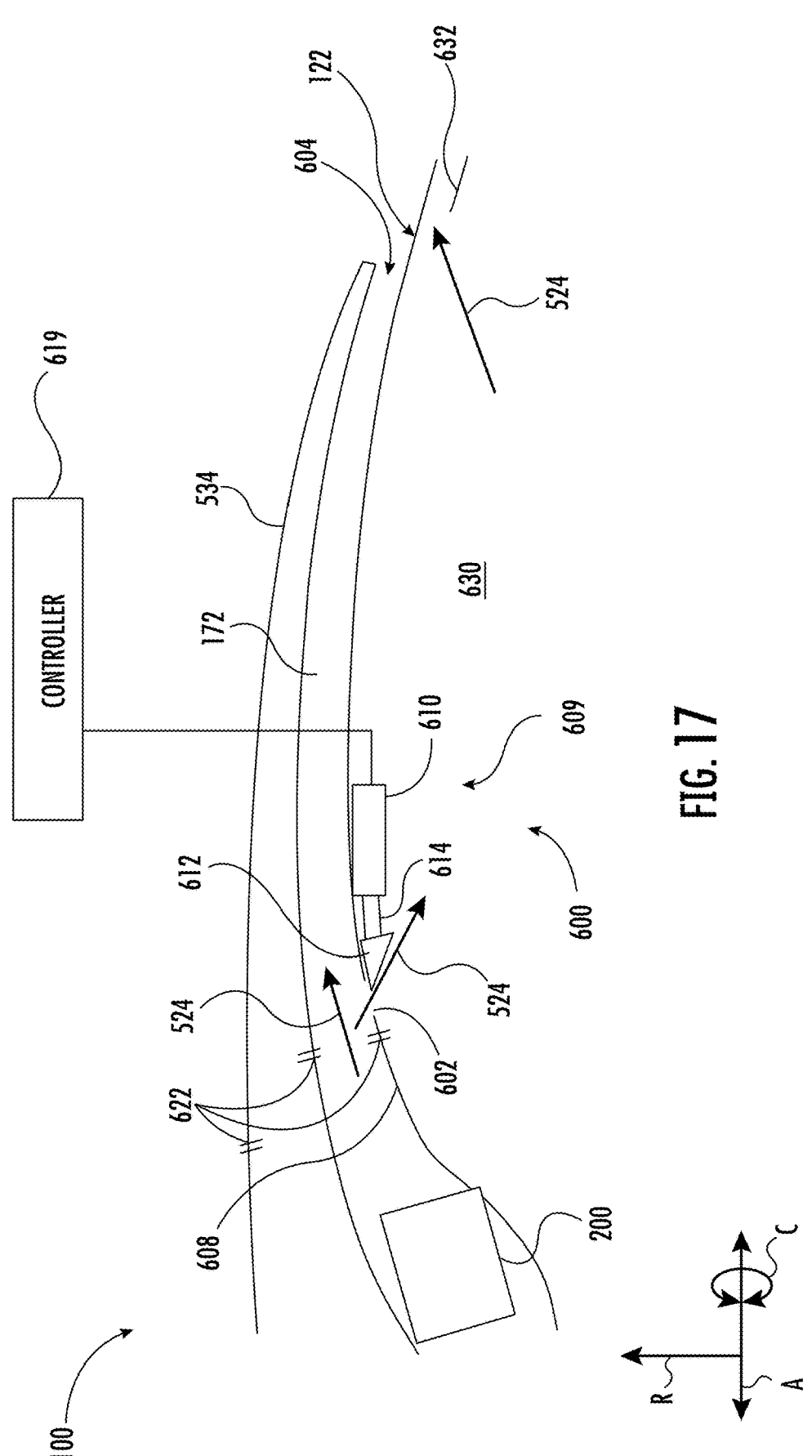
FIG. 17 is a schematic, cross-sectional view of a variable third stream exhaust area system in accordance with an exemplary aspect of the present disclosure.

Referring now to FIG. 17, another embodiment of the variable third stream exhaust area system 600 is schematically depicted. In the illustrated embodiment, the variable third stream exhaust area system 600 includes the one or more bleed passageways 602 fluidly connected to the fan duct 172 and extending radially inward with respect to the fan duct 172. In the illustrated embodiment, the one or more bleed passageways 602 extend radially inward with respect to the fan duct to an interior area or core compartment 630 of the core cowl 122. The portion of the third stream 525 flowing through the bleed passageway 602 may be routed through a conduit, channel, or other type of flow path and is exhausted or exits the core compartment 630 through one or more core cowl vents 632 defined at an aft portion of the core cowl 122. The core cowl vent 632 may be an annular or semi-annular configuration. The core cowl vent 632 may be any shape such as, and not by way of limitation, similar in shape as the one or more passageways 602 such that the core cowl vent 632 may extend longitudinally in an axial direction, longitudinally in a circumferential direction, a combination thereof, or in other directions.

In the illustrated embodiment of FIG. 17, the variable third stream exhaust area system 600 includes one or more actuation devices 609 to open or close the bleed passageway 602. In the illustrated embodiment, the one or more actuation devices 609 include one or more actuators 610, one or more dams 612, and one or more rods 614 coupling the one or more dams 612 to the one or more actuators 610. The one or more bleed passageways 602 and/or the one or more actuation devices 609 may be configured similarly to the bleed passageways 602 and/or actuation devices of FIGS. 12-14 such that, not by way of limitation, a longitudinal length of the one or more passageways 602 may extend axially, circumferentially, a combination thereof, or various other directions, and the one or more actuators 610 may be independently controllable or may be ganged together for uniform control. In exemplary embodiments, the one or more actuators 610 are communicatively coupled to the one or more controllers 619 to enable automatic control or actuation of the one or more actuators 610. In the illustrated embodiment of FIG. 17, forward axial movement of the dam 612 closes the bleed passageway 602 and aft axial movement of the dam 612 opens the bleed passageway 602. In the illustrated embodiment, the bleed passageway 602 extends radially inward from the radially outward surface 608 of the core cowl 122 and is angled in a radially inward and aft direction. In the illustrated embodiment, the one or more actuation devices 609 are located at least partially within the core cowl 122. In the illustrated embodiment, the bleed passageway 602 is located downstream of the one or more interface locations 622. However, it should be understood that the bleed passageway 602 may additionally or alternatively be located upstream of the one or more interface locations 622.

Figure 18:
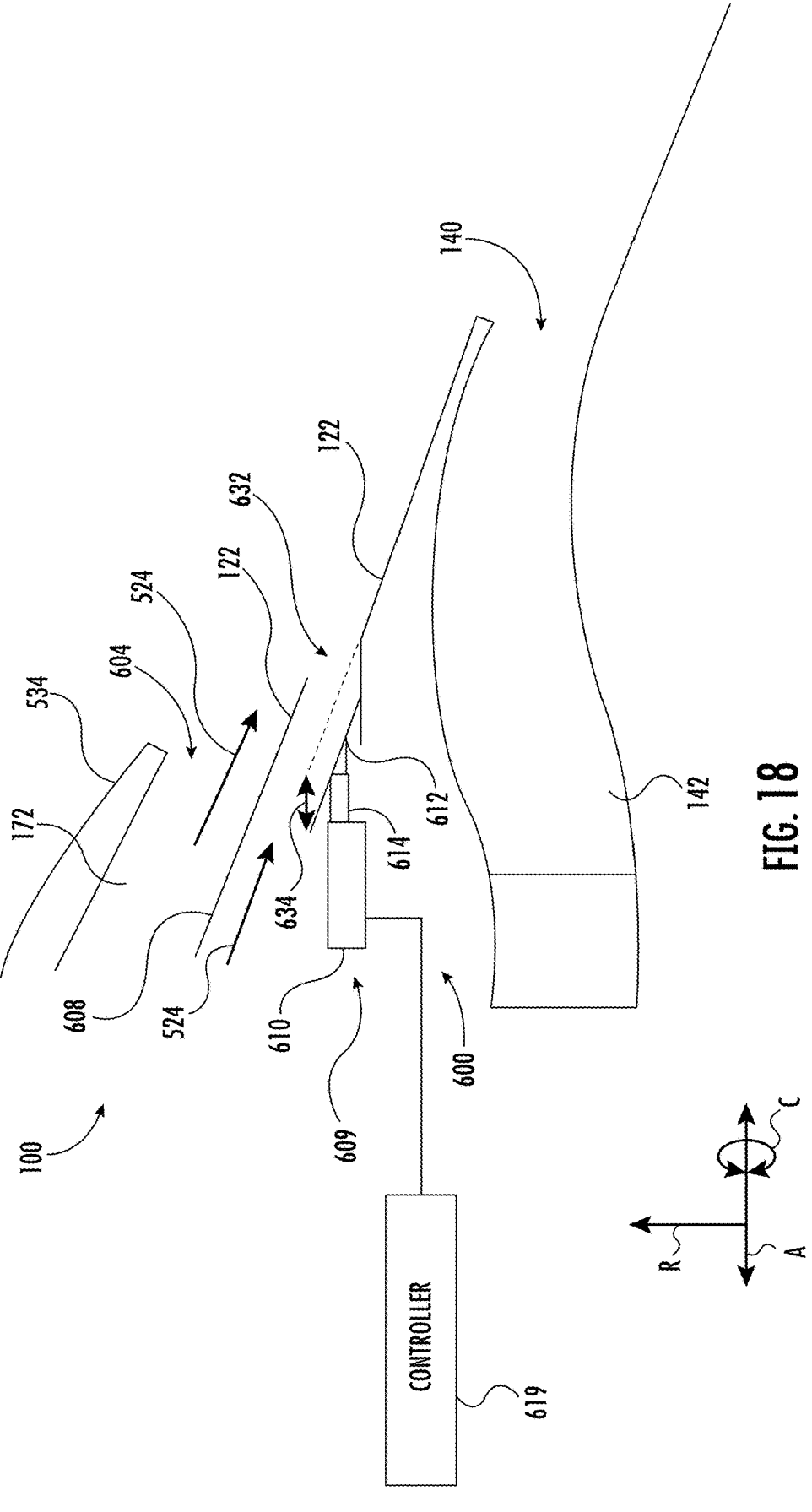
FIG. 18 is a schematic, cross-sectional view of a variable third stream exhaust area system in accordance with an exemplary aspect of the present disclosure.

Referring now to FIG. 18, another embodiment of the variable third stream exhaust area system 600 is schematically depicted. In the illustrated embodiment, the variable third stream exhaust area system 600 includes one or more actuation devices 609 associated with the core cowl vent 632. In exemplary embodiments, the one or more actuation devices 609 include one or more actuators 610, one or more dams 612, and one or more rods 614 coupling the one or more dams 612 to the one or more actuators 610. The one or more actuators 610 are actuable to vary an area of the core cowl vent 632 via movement of the one or more dams 612. The embodiment of the variable third stream exhaust area system 600 depicted in FIG. 18 may be combined with the embodiment of the variable third stream exhaust area system 600 of FIG. 17 such that instead of a static or fixed size of the core cowl vent 632 as depicted in FIG. 17, a size of the core cowl vent 632 may be variably controlled as depicted in FIG. 18. In the embodiment illustrated in FIG. 18, the one or more actuation devices 609 are located within the core cowl 122 or radially inward with respect to the radially outward surface 608 of the core cowl 122. In the illustrated embodiment, the dam 612 is movable in forward and aft axial directions, indicated by the directions 634. In the illustrated embodiment, forward axial movement of the dam 612 increases the area of the core cowl vent 632 and aft axial movement of the dam 612 decreases the area of the core cowl vent 632 (depicted in dashed lines in FIG. 18). It should be understood that the one or more actuation devices 609 may be positioned or oriented differently to accommodate different orientations of the core cowl vent 632 and different movement directions of the one or more dams 612 such as, not by way of limitation, depicted in FIGS. 14 and 15. In exemplary embodiments, the one or more actuators 610 are communicatively coupled to the one or more controllers 619 to enable automatic control or actuation of the one or more actuators 610. The one or more actuators 610 may be independently controllable or may be ganged together for uniform control.

Figures 19, 20:
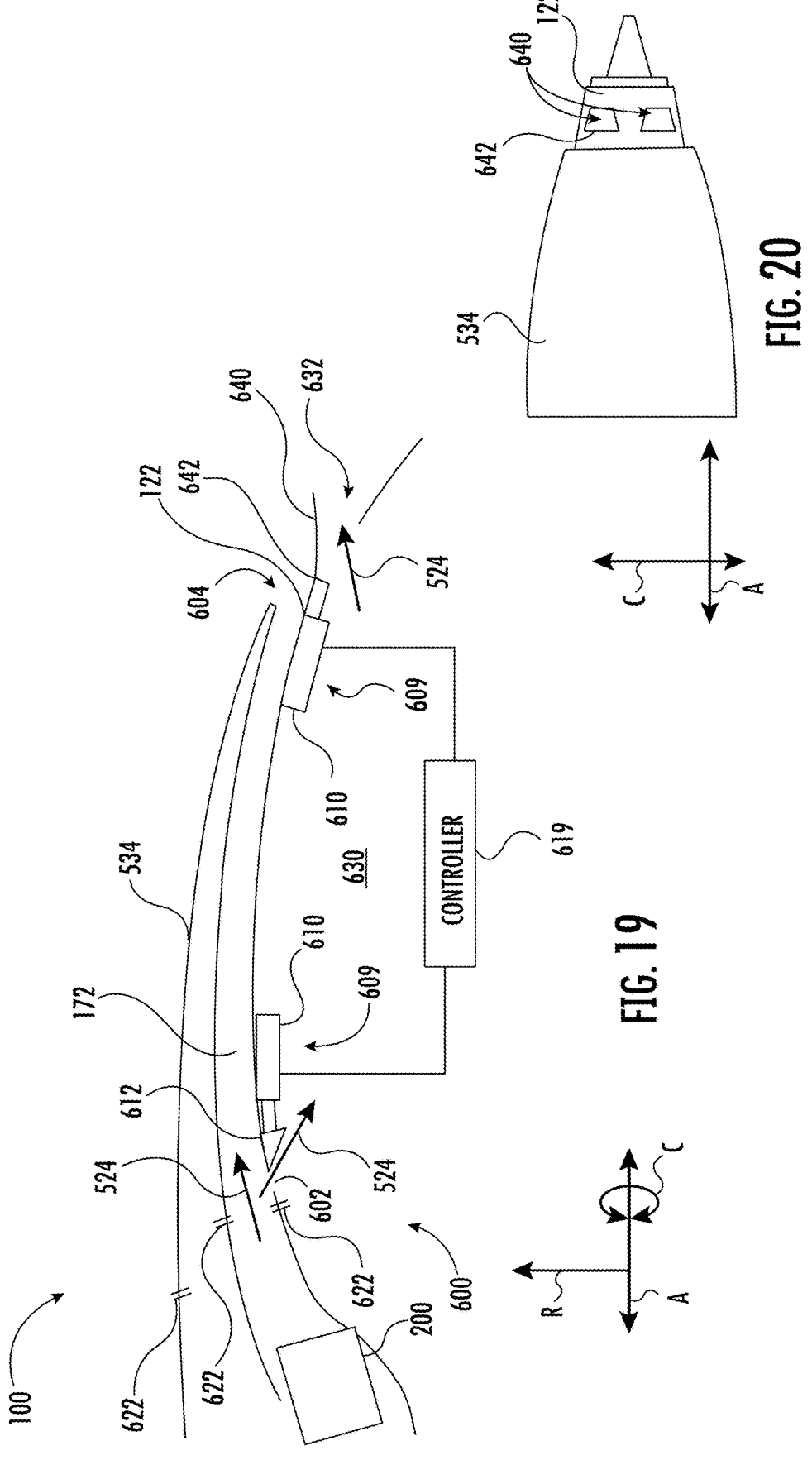
FIG. 19 is a schematic, cross-sectional view of a variable third stream exhaust area system in accordance with an exemplary aspect of the present disclosure.
FIG. 20 is a schematic top, plan view of an exemplary embodiment of the variable third stream exhaust area system of FIG. 19.

Referring now to FIGS. 19 and 20, another embodiment of the variable third stream exhaust area system 600 is schematically depicted. In the illustrated embodiment, the variable third stream exhaust area system 600 includes one or more actuation devices 609 and one or more bleed passageways 602 that may be configured similarly to the third stream exhaust area system 600 of FIG. 17. In the illustrated embodiment of FIGS. 19 and 20, the third stream exhaust area system 600 also includes one or more actuation devices 609 configured to control movement of one or more doors 640 to vary an area of the core cowl vent 632. In exemplary embodiments, the one or more doors 640 may be coupled to one or more actuators 610 to enable the one or more doors 640 to be moved to fully open positions, fully closed positions, or a partially open position. In the illustrated embodiment, the one or more doors 640 are rotatably coupled to one or more hinge locations 642 located at or proximate to the radially outward surface 608 of the core cowl 122 such that the one or more doors 640 are movable radially outward and inward with respect to the surface 608 of the core cowl 122 to vary a size of the core cowl vent 632. Thus, in exemplary embodiments, the one or more actuators 610 are actuable to move the one or more doors to an open position, as depicted in FIG. 19, to enable additional third stream 524 air flow via the one or more bleed passageways 602 and core cowl vents 632. In exemplary embodiments, the one or more actuators 610 are communicatively coupled to the one or more controllers 619 to enable automatic control or actuation of the one or more actuators 610. The one or more actuators 610 may be independently controllable or may be ganged together for uniform control. In exemplary embodiments, the one or more actuators 610 controlling movement of the one or more dams 612 may be coordinated with control of the one or more actuators 610 controlling movement of the one or more doors 640 such that the one or more bleed passageways 602 are opened or closed in coordination with the opening or closing of the one or more doors 640. However, it should also be understood that the one or more actuators 610 controlling movement of the one or more dams 612 may be controlled independently of the one or more actuators 610 controlling movement of the one or more doors 640. Further, it should be understood that one or more of the actuators 610 controlling movement of the one or more dams 612 and/or one or more of the actuators 610 controlling movement of the one or more doors 640 may be independently controllable or may be ganged together for uniform or simultaneous operation. It should also be understood that the embodiment of the variable third stream exhaust area system 600 depicted in FIG. 18 could be combined with the embodiment of the variable third stream exhaust area system 600 depicted in FIGS. 19 and 20.

Figure 21:
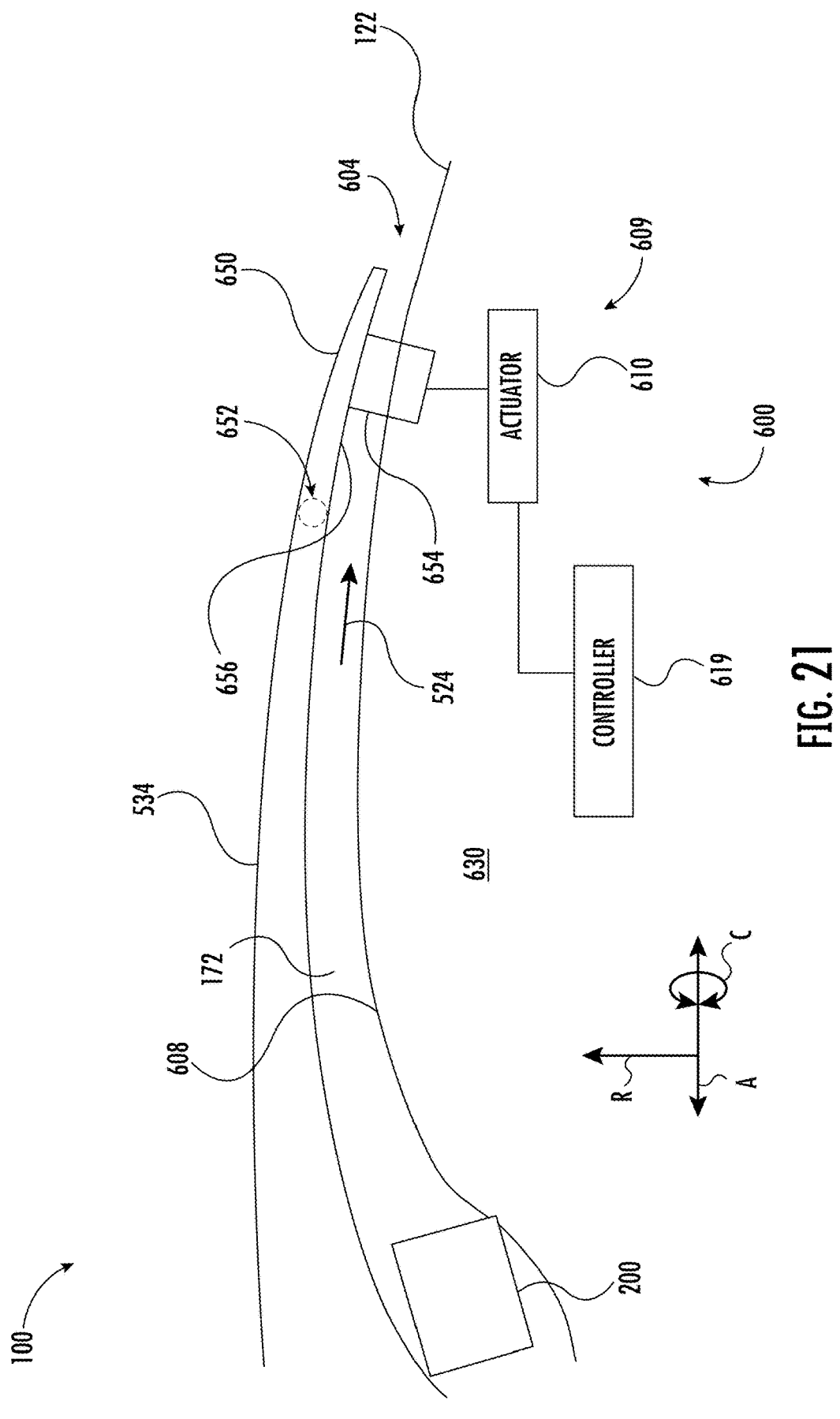
FIG. 21 is a schematic, cross-sectional view of a variable third stream exhaust area system in accordance with an exemplary aspect of the present disclosure.
Figure 22:
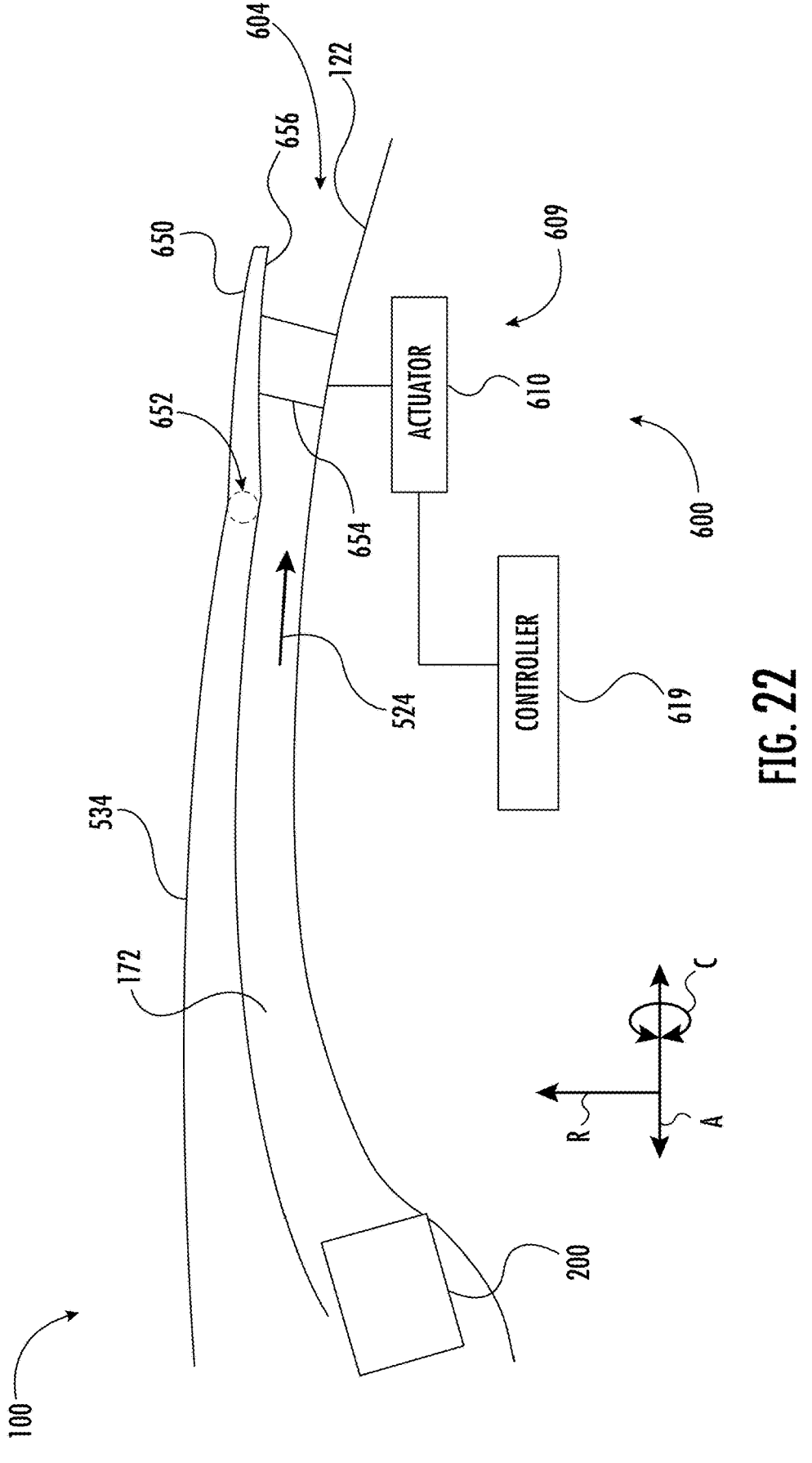
FIG. 22 is a schematic, cross-sectional view of a variable third stream exhaust area system in accordance with an exemplary aspect of the present disclosure.

Referring now to FIGS. 21 and 22, another embodiment of the variable third stream exhaust area system 600 is schematically depicted. In the illustrated embodiment, the variable third stream exhaust area system 600 includes one or more actuation devices 609 actuable to vary an area of the fan duct exhaust nozzle 604. In the illustrated embodiment, the one or more actuation devices 609 include one or more flaps 650 movably coupled to the outer nacelle 534. The one or more flaps 650 may be moved radially outward and inward with respect to the fan duct 172 to vary an exit area of the fan duct exhaust nozzle 604. In the illustrated embodiment of FIGS. 21 and 22, the one or more flaps 650 are rotatably coupled to the outer nacelle 534 at one or more hinge locations 652 and define at least a portion of the fan duct 172. In exemplary embodiments, the one or more actuation devices 609 include one or more actuators 610 coupled to one or more arms 654. In exemplary embodiments, the one or more arms 654 extend radially outward from the core cowl 122 and are configured to contact or be coupled to a radially inward surface 656 of the flap 650. In operation, the one or more actuators 610 are actuable to extend the arm 654 radially outward to increase an exit area of the fan duct exhaust nozzle 604 (as depicted in FIG. 22) and retract the one or more arms 654 to decrease an exit area of the fan duct exhaust nozzle 604 or return the flap 650 to a non-extended position (as depicted in FIG. 21). It should be understood that the flap 650 may be moved to a position between a fully extended or fully retracted position. In the illustrated embodiment, the actuation device 609 is disposed at least partially within the core cowl 122. However, it should be understood that, alternatively or additionally, at least a portion of the actuation device 609 may be located within the outer nacelle 534 such as, by way of non-limiting example, in a portion of the outer nacelle 534 upstream from the hinge location 652. It should be understood that in such an exemplary embodiment, the arm 654 may be omitted such that movement of the flap 650 is controlled entirely by one or more actuation devices 609 located in the outer nacelle 534. In exemplary embodiments, the one or more actuators 610 are communicatively coupled to the one or more controllers 619 to enable automatic control or actuation of the one or more actuators 610. The one or more actuators 610 may be independently controllable or may be ganged together for uniform control of the flaps 650.

Figure 23A:
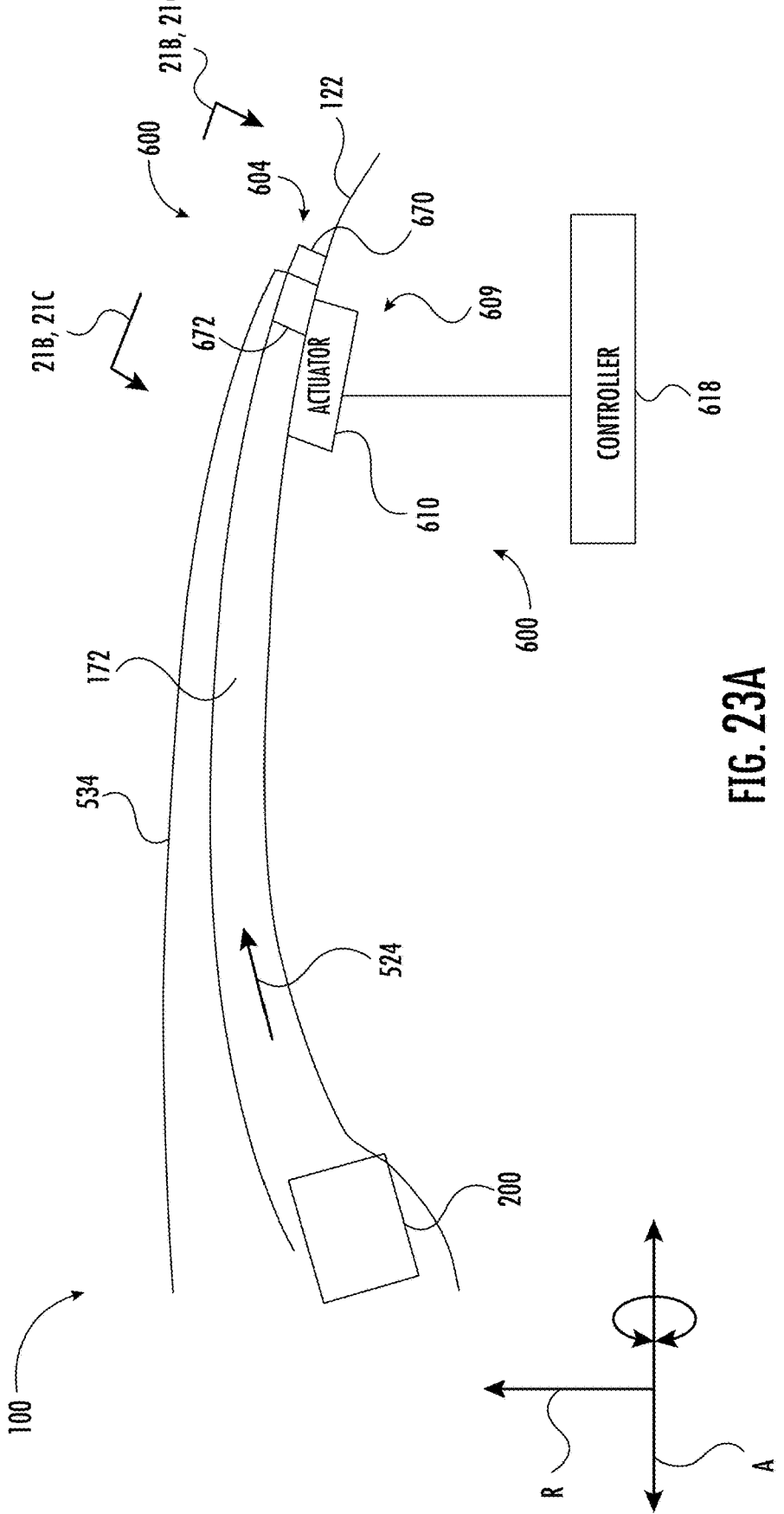
FIG. 23A is a schematic, cross-sectional view of a variable third stream exhaust area system in accordance with an exemplary aspect of the present disclosure.
Figures 23B, 23C:
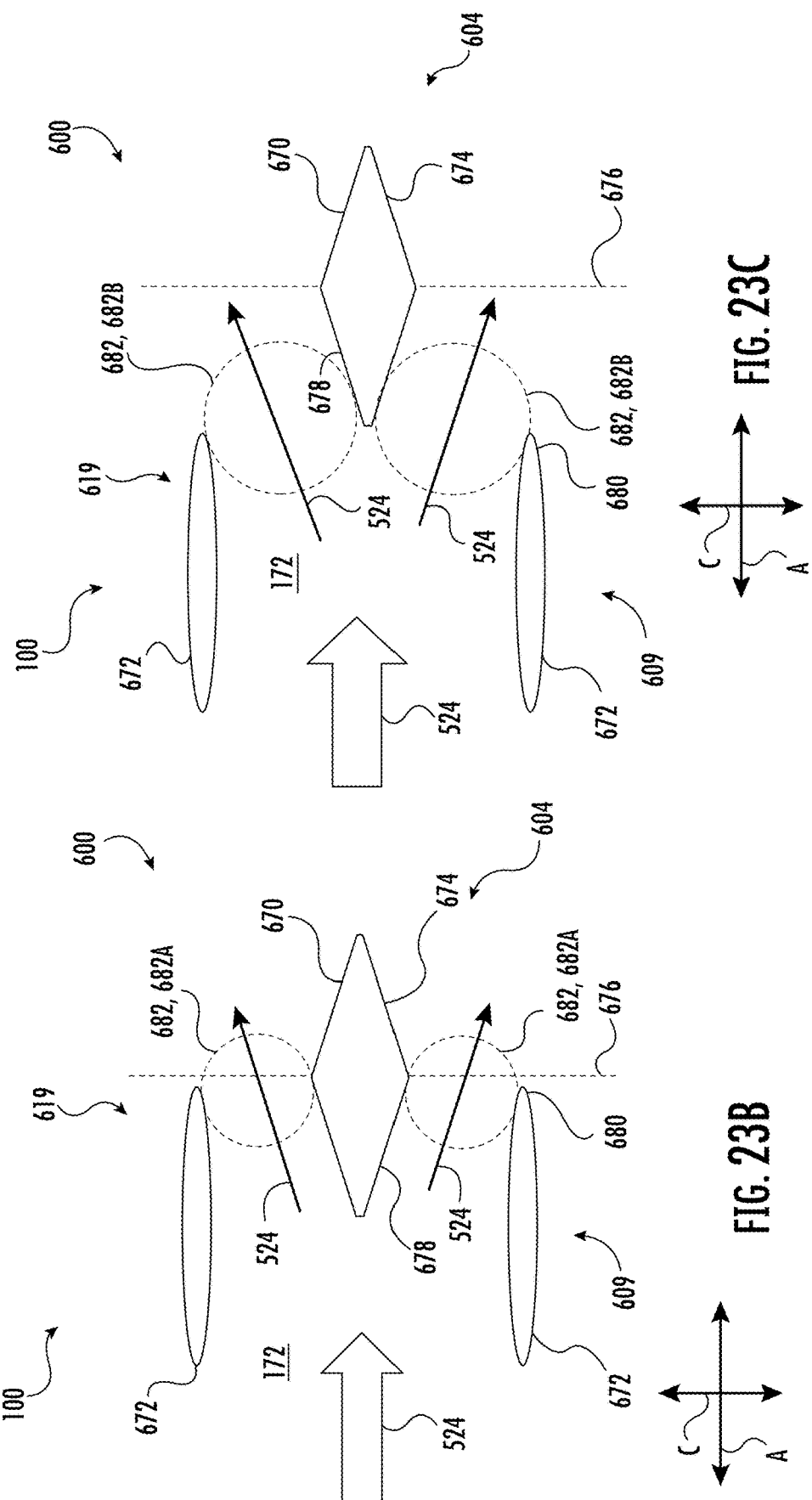
FIG. 23B is a schematic top, plan view of an exemplary embodiment of the variable third stream exhaust area system of FIG. 23A.
FIG. 23C is a schematic top, plan view of an exemplary embodiment of the variable third stream exhaust area system of FIG. 23A.

Referring now to FIGS. 23A-23C, another embodiment of the variable third stream exhaust area system 600 is schematically depicted. In the illustrated embodiment, the variable third stream exhaust area system 600 includes one or more actuation devices 609 actuable to vary an area of the fan duct exhaust nozzle 604. In the illustrated embodiment, the variable third stream exhaust area system 600 includes one or more structural elements 670 disposed at least partially within the fan duct 172. In embodiments using a plurality of structural elements 670, the structural elements 670 may be spaced apart from each circumferentially about the fan duct 172. In the illustrated embodiment, at least a portion of the structural element 670 extends radially outward from at least a portion of the core cowl 122 to at least a portion of the outer nacelle 534. However, it should be understood that the structural element 670 may extend only partially into the fan duct 172 instead of extending across an entire radial distance of the fan duct 172 (e.g., extending radially across a partial radial distance of the fan duct 172 from either the core cowl 122 or the outer nacelle 534).

In exemplary embodiments, the one or more actuation devices 609 include one or more fairings 672 configured for axial forward and aft movement within the fan duct 172 and with respect to the one or more structural elements 670 to vary a flow area of the fan duct exhaust nozzle 604. The one or more fairings 672 are positioned adjacent the one or more structural elements 670 to define a flow path between the respective fairing 672 and the one or more structural elements 670. The one or more fairings 672 may extend an entire radial distance across the fan duct 172 from the core cowl 122 to the outer nacelle 534 or may extend radially only part of the radial distance between the core cowl 122 and the outer nacelle 534. The structural element 670 and the fairing 672 may have an aerodynamic shape or profile conducive to the flow of the third stream 524 through the fan duct 172 and around the structural element 670 and the fairing 672. In exemplary embodiments, one or more actuators 610 are coupled to the one or more fairings 672 to cause forward and axial movement of the one or more fairings 672. The one or more actuators 610 are communicatively coupled to the one or more controllers 619 to enable automatic control or actuation of the one or more actuators 610. The one or more actuators 610 may be independently controllable to enable individual movement of particular fairings 672 or may be ganged together for uniform movement of a plurality of the fairings 672.

In the illustrated embodiment, an aft portion 674 of the structural element 670 extends aft of an exit 676 of the fan duct exhaust nozzle 604 and a forward portion 678 of the structural element 670 extends forward of the exit 676 of the fan duct exhaust nozzle 604. In FIG. 23B, the one or more fairings 672 are located in their aft-most positions such that an aft end 680 of the respective fairing 672 is located at or proximate to the exit 676 of the fan duct exhaust nozzle 604. In FIG. 23C, the one or more fairings 672 are depicted in an axial forward position. As depicted in FIGS. 23B and 23C, the axial position of the one or more fairings 672 with respect to the structural element 670 changes a size of a flow area 682 for the third stream 524. In exemplary embodiments, the one or more fairings 672 form a convergent nozzle within the fan duct 172 such that the third stream 524 converges before reaching the exit 676 of the fan duct exhaust nozzle 604. In the aft most position of the one or more fairings 672 (FIG. 23B), the flow area 682A defined between a respective fairing 672 and the structural element 670 is less than the flow area 682B (FIG. 23C) defined between a respective fairing 672 and the structural element 670 with the fairing 672 moved to an axially forward position. Thus, in exemplary embodiments, movement of the one or more fairings 672 with respect to the structural element 670 varies a flow area available to the third stream 524. In FIGS. 23B and 23C, two fairings 672 are depicted;

however, it should be understood that a single fairing 672 may be used with respect to one or more structural elements 670.

Figure 24A:
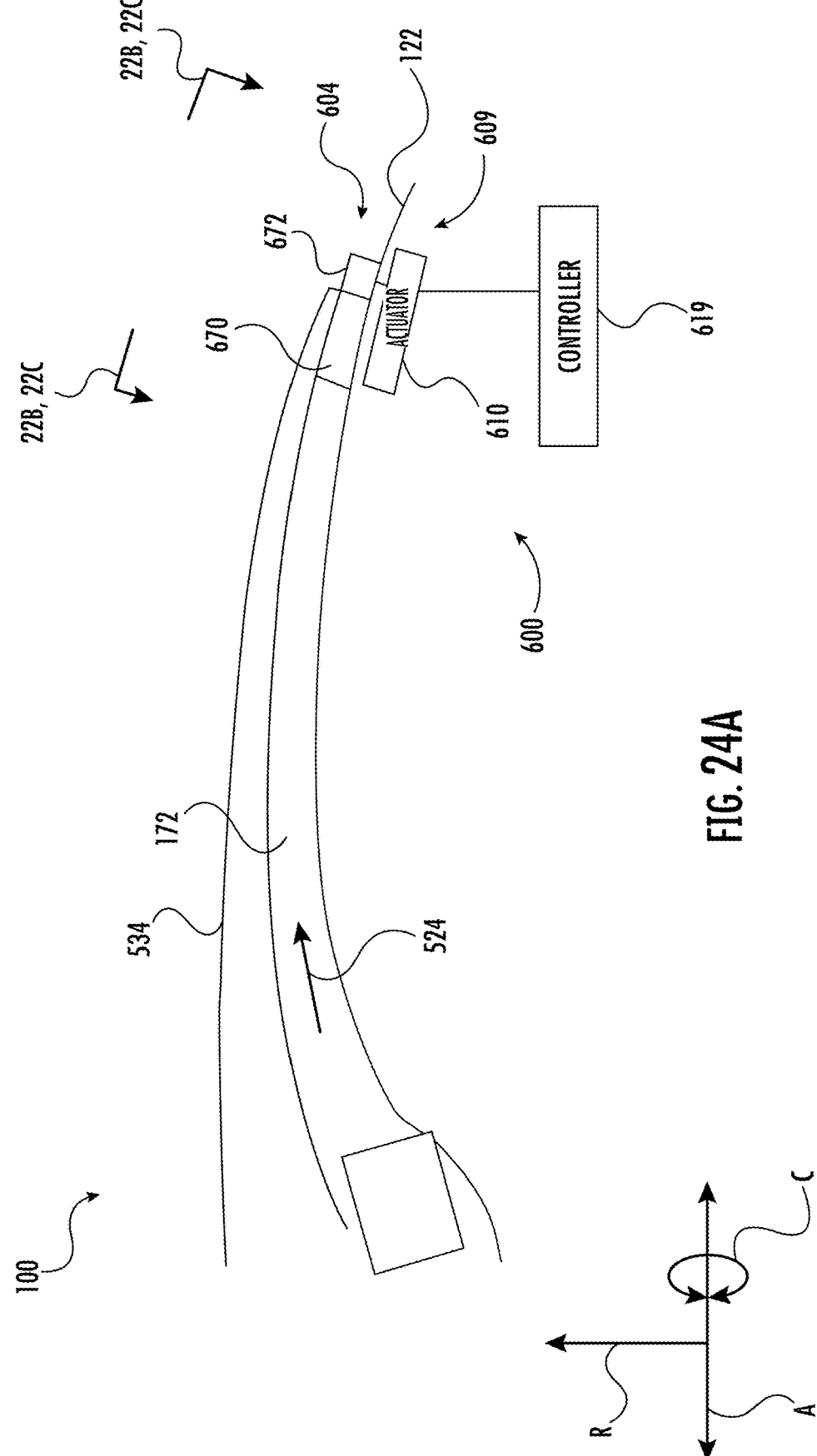
FIG. 24A is a schematic, cross-sectional view of a variable third stream exhaust area system in accordance with an exemplary aspect of the present disclosure.
Figure 24C:
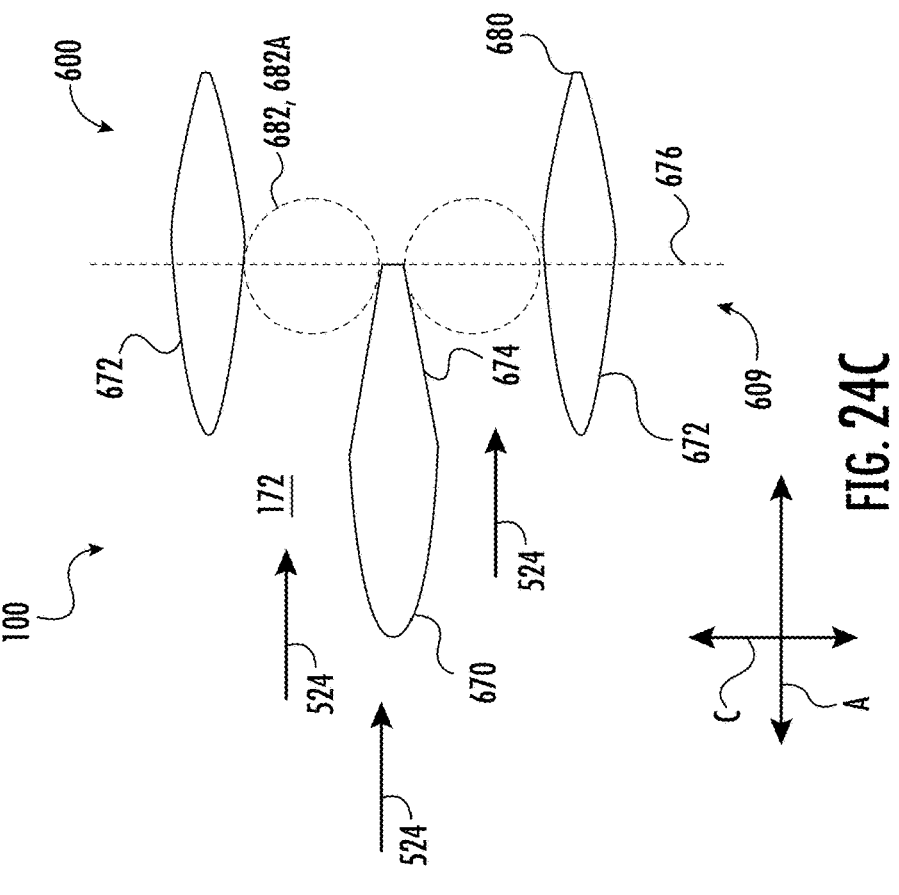
FIG. 24C is a schematic top, plan view of an exemplary embodiment of the variable third stream exhaust area system of FIG. 24A.
Figure 24B:
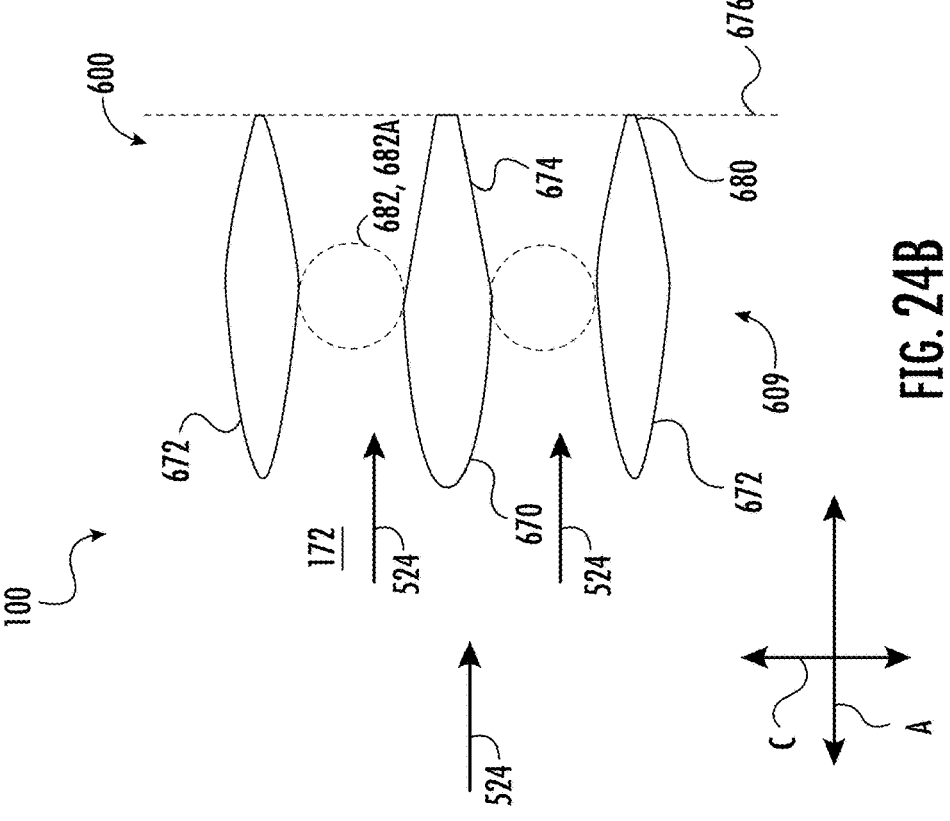
FIG. 24B is a schematic top, plan view of an exemplary embodiment of the variable third stream exhaust area system of FIG. 24A.

Referring now to FIGS. 24A-24C, another embodiment of the variable third stream exhaust area system 600 is schematically depicted. In the illustrated embodiment, the variable third stream exhaust area system 600 may be configured similarly to the variable third stream exhaust area system 600 of FIGS. 23A-23C except the one or more fairings 672, in an axial forward position, have the aft end 680 of a respective fairing 672 located at or near the exit 676 of the of the fan duct exhaust nozzle 604 (FIG. 24A). Additionally, an aft end 684 of the structural element 670 is located at or near the exit 676 of the of the fan duct exhaust nozzle 604. In FIG. 24B, the one or more fairings 672 are depicted in an axially aft position such that at least a portion of the one or more fairings 672 is located aft or downstream of the exit 676 of the of the fan duct exhaust nozzle 604. As depicted in FIGS. 24B and 24C, the axial position of the one or more fairings 672 with respect to the structural element 670 changes a size of a flow area 682 for the third stream 524. In exemplary embodiments, the one or more fairings 672 form a convergent-divergent nozzle within the fan duct 172 such that the third stream 524 converges and then diverges before reaching the exit 676 of the fan duct exhaust nozzle 604. In the aft most position of the one or more fairings 672 (FIG. 24C), the flow area 682B defined between a respective fairing 672 and the structural element 670 is greater than the flow area 682A (FIG. 24B) defined between a respective fairing 672 and the structural element 670 with the fairing 672 moved to an axially forward position. Thus, in exemplary embodiments, movement of the one or more fairings 672 with respect to the structural element 670 varies the flow area 682 available to the third stream 524. In FIGS. 24B and 24C, two fairings 672 are depicted; however, it should be understood that a single fairing 672 may be used with respect to one or more structural elements 670.

Figure 25A:
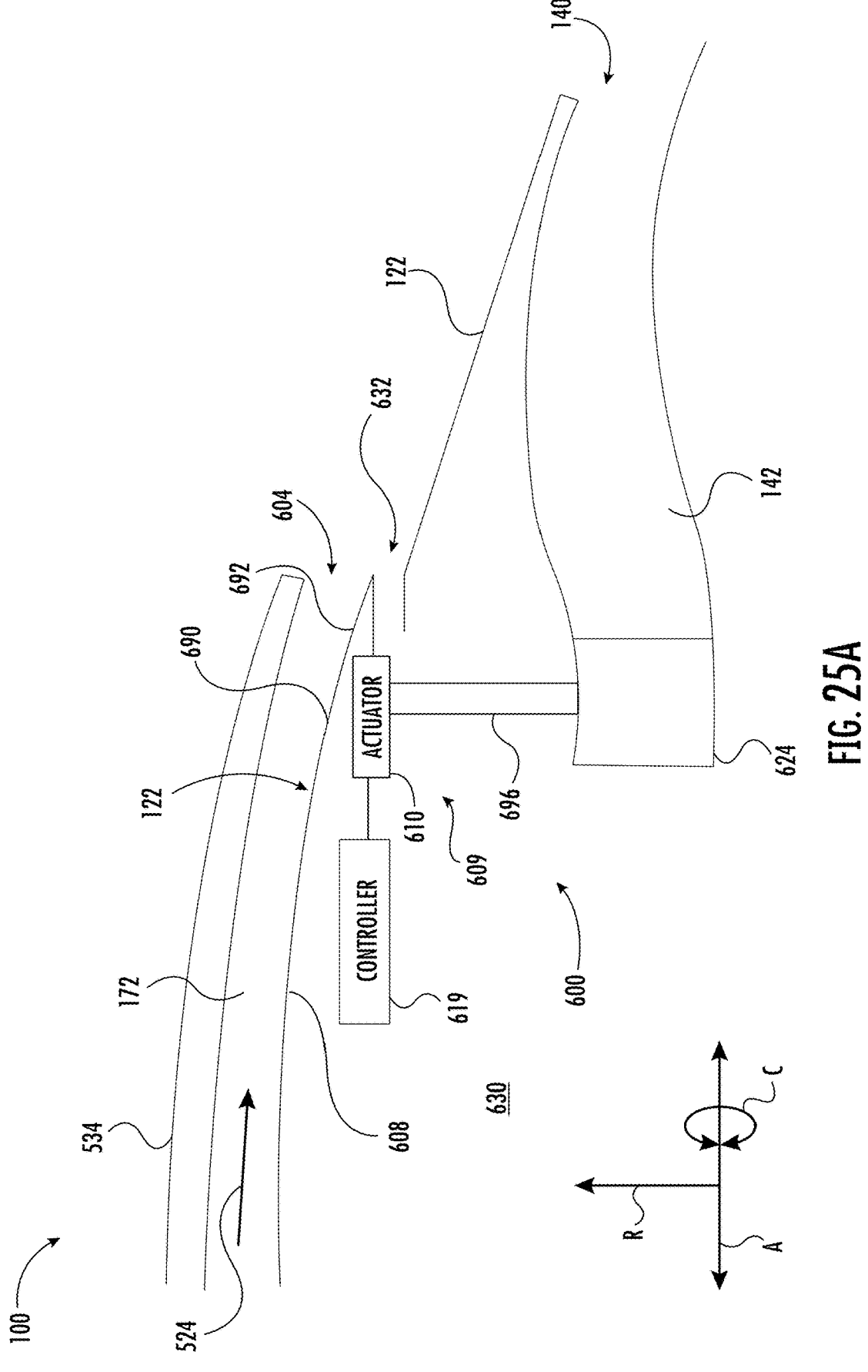
FIG. 25A is a schematic, cross-sectional view of a variable third stream exhaust area system in accordance with an exemplary aspect of the present disclosure.
Figure 25B:
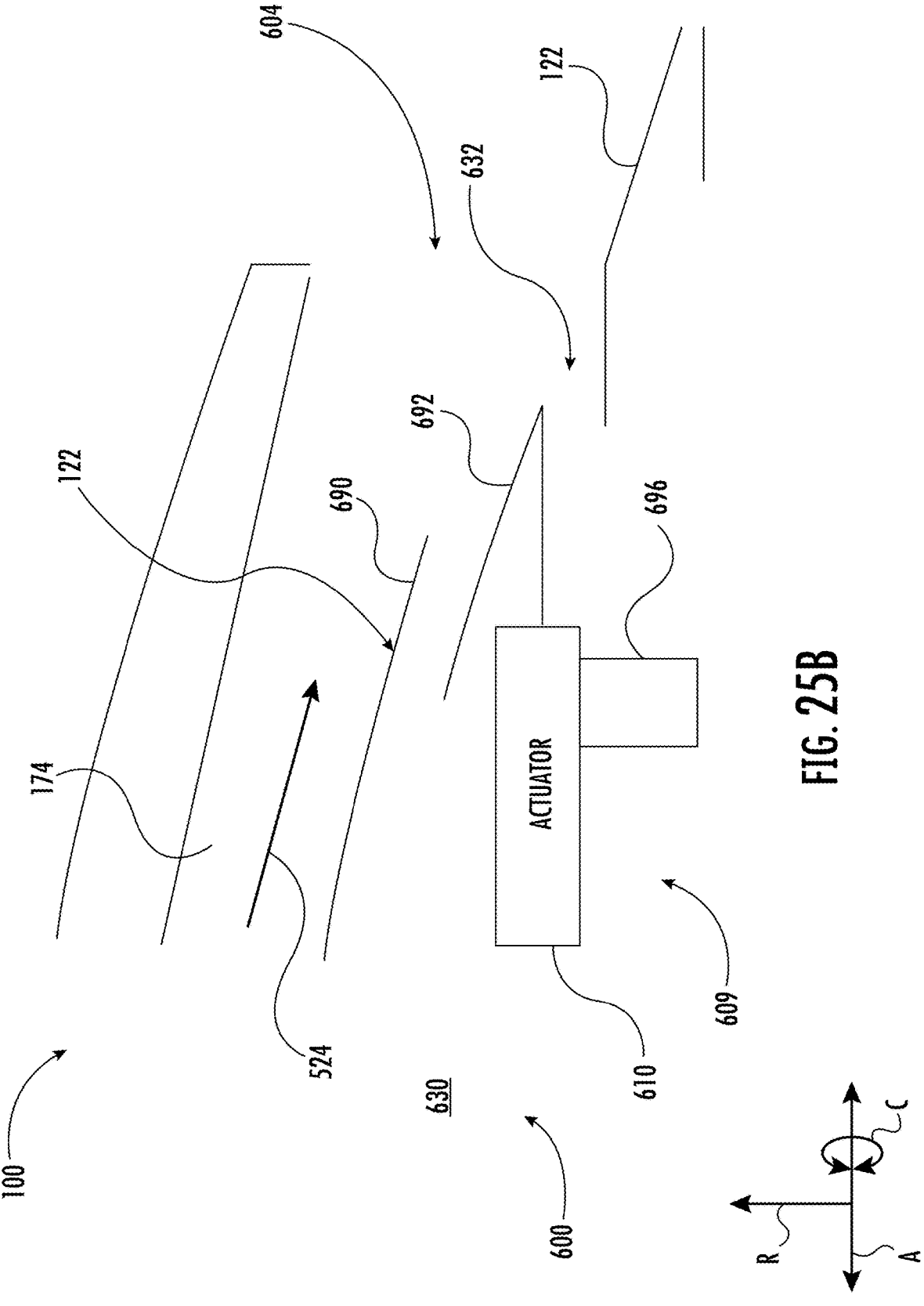
FIG. 25B is a schematic, enlarged view of a portion of the variable third stream exhaust area system of FIG. 25A.

Referring now to FIGS. 25A and 25B, another embodiment of the variable third stream exhaust area system 600 is schematically depicted. In the illustrated embodiment, the variable third stream exhaust area system 600 includes one or more actuation devices 609 configured to vary an area of the fan duct exhaust nozzle 604. In the illustrated embodiment, the one or more actuation devices 609 form at least a portion of the core cowl 122. In exemplary embodiments, the core cowl 122 includes a forward portion 690 and an aft portion 692 disposed downstream of the forward portion 690. The forward and aft portions 690, 692 define at least a portion of the fan duct 172. The one or more actuation devices 609 include the aft portion 692 and one or more actuators 610 coupled to the aft portion 692. The one or more actuators 610 are actuable to move the aft portion 692 axially and/or radially with respect to the surface 608 of the core cowl 122 to vary an area of the fan duct exhaust nozzle 604. In the illustrated embodiment, the one or more actuators are coupled to a turbine rear frame 694 via one or more structural elements 696 such that the one or more actuation devices are disposed radially inward of the radially outward surface 608 of the core cowl 122. The turbine rear frame 694 provides support for various rotating components of the gas turbine engine 100. In the illustrated embodiment, the core cowl 122 includes the core cowl vent 632, and the one or more actuation devices 609 are located upstream of the core cowl vent 632 with respect to the fan duct 172. However, it should be understood that the core cowl vent 632 may be omitted from the core cowl 122.

In exemplary embodiments, in certain operating states of the gas turbine engine 100, the one or more actuation devices 109 may be set for a normal or minimum defined area of the fan duct exhaust nozzle 604, as depicted in FIG. 25A, such that the aft portion 692 is aligned with the forward portion 690 with respect to the surface 608. In another operating state of the gas turbine engine 100, the one or more actuation devices 109 may be set for an increased area of the fan duct exhaust nozzle 604, as depicted in FIG. 25B, by moving the aft portion 692 radially inward and/or axially forward. In exemplary embodiments, one or more of the actuation devices may be located annularly or semi-annularly with respect to the fan duct 172. In exemplary embodiments, the one or more actuators 610 are communicatively coupled to the one or more controllers 619 to enable automatic control or actuation of the one or more actuators 610. The one or more actuators 610 may be independently controllable or may be ganged together for uniform control.

Referring now to FIGS. 26A-26D, another embodiment of the variable third stream exhaust area system 600 is schematically depicted. In the illustrated embodiment, the variable third stream exhaust area system 600 includes one or more actuation devices 609 configured to vary an area of the fan duct exhaust nozzle 604. In the illustrated embodiment, the one or more actuation devices 609 include one or more flaps 700 pivotally coupled to a pylon structure 702 supporting the attachment of the gas turbine engine 100 to an aircraft 704. The one or more flaps 700 are pivotally coupled to the pylon structure 702 at an attachment location 708 and extend axially aft to the exit 676 of the fan duct exhaust nozzle 604. In exemplary embodiments, the flap 700 is a semi-annular flap located at approximately a twelve o-clock position with respect to the gas turbine engine 100 and extends circumferentially a defined distance on either side of the twelve o'clock position. However, it should be understood that one or more additional flaps 700 may be located at other positions with respect to the gas turbine engine 100 or fan duct 172.

In exemplary embodiments, the one or more flaps 700 define an outer radial boundary of at least a portion of the fan duct 172. Although not explicitly depicted in FIGS. 26A-26D, the one or more actuation devices 609 may include one or more actuators 610 coupled to the one or more flaps 700, and one or more controllers 619 communicatively coupled to the one or more actuators 610, similar to the embodiments set forth in FIGS. 13-19, 21-23A, 24A, 25A, and 25B, to enable automatic control and movement of the one or more flaps 700. The one or more actuators 610 may be located within the pylon structure 702 and may be configured for independent control or may be ganged together for uniform movement of a plurality of flaps 700.

Figures 26A, 26B, 26C, 26D:
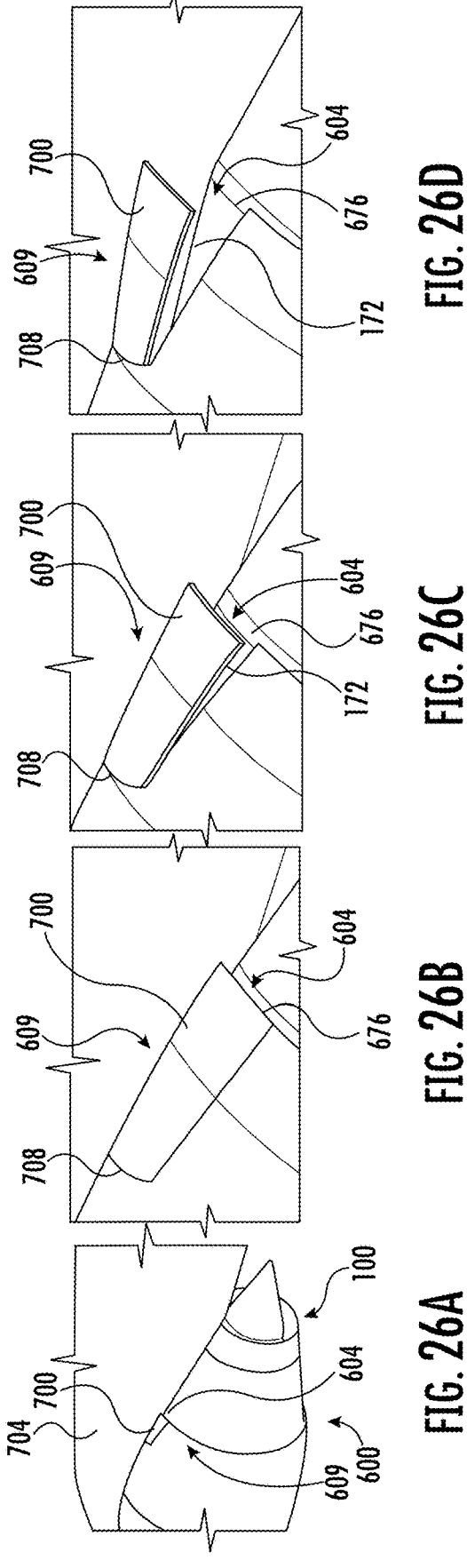
FIGS. 26A-26D are schematic perspective views of a variable third stream exhaust area system in accordance with an exemplary aspect of the present disclosure.

FIGS. 26A and 26B depict a stowed position of the flap 700, such as during a cruise or climb flight phase of the aircraft 704 such that the fan duct exhaust nozzle 604 is sized for performance requirements for such flight phases. FIG. 26C depicts the flap 700 in a partially deployed position such that the exit area of the fan duct exhaust nozzle 604 is increased for flight phases such as, not by way of limitation, a takeoff flight phase of the aircraft 704. FIG. 26D depicts the flap 700 in a fully deployed position such that the exit area of the fan duct exhaust nozzle 604 is further increased for an operating condition of the gas turbine engine 100 such as, not by way of limitation, an idle operation state.

Figure 27:
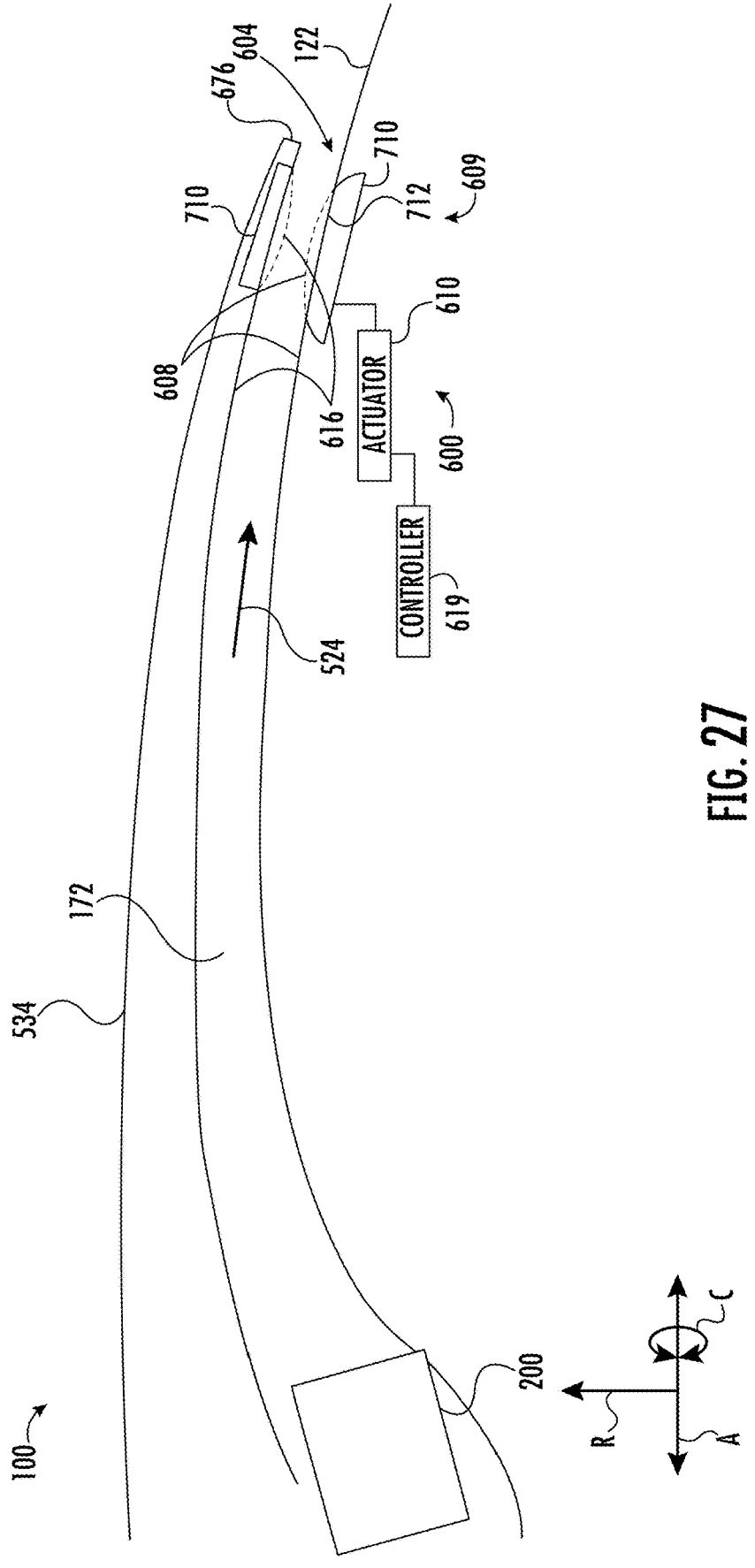
FIG. 27 is a schematic, cross-sectional view of a variable third stream exhaust area system in accordance with an exemplary aspect of the present disclosure.

Referring now to FIG. 27, another embodiment of the variable third stream exhaust area system 600 is schematically depicted. In the illustrated embodiment, the variable third stream exhaust area system 600 includes one or more actuation devices 609 configured to vary an area of the fan duct exhaust nozzle 604. In the illustrated embodiment, the one or more actuation devices 609 include one or more bladders 710 disposed within the core cowl 122 that may by be expanded such that at least a portion of the radially outward surface 608 of the core cowl 122 extends radially outward to decrease an area of the fan duct 172 (depicted in dashed lines in FIG. 27). In exemplary embodiments, the one or more bladders 710 may be located proximate to a portion 712 of the core cowl that is formed from an elastic sheet material or a non-metallic elastic material to enable the portion 712 to extend radially outward to decrease an area of the fan duct 172 and retract radially inward to increase the area of the fan duct (e.g., returning to its non-extended position). In exemplary embodiments, the one or more bladders 710 may be coupled to one or more actuators 610 to force compressed air into the bladder 710 to expand the bladder 710 radially outward and release the pressure of the compressed air to return the bladder 710 to its non-extended position. The one or more actuators 610 may be communicatively coupled to the one or more controllers 619 to enable automatic control of the one or more actuators 610. The one or more bladders 710 may include an annular bladder 710 or one or more non-annular bladders 710. In cases where a plurality of bladders 710 are used, the one or more actuators 610 may be controlled independently or may be ganged together for uniform expansion of the plurality of bladders 710.

Additionally or alternatively, the one or more bladders 710 may be located within the outer nacelle 534 and located proximate to the radially inward surface 616 of the outer nacelle 534. The one or more bladders 710 in the outer nacelle 534 may be configured similarly to the one or more bladders 710 located within the core cowl 122. The one or more bladders 710 located within the outer nacelle 534 may be controlled independently of the one or more bladders 107 located within the core cowl 122, or the one or more bladders 710 located within the outer nacelle 534 may be ganged together with the one or more bladders 107 located within the core cowl 122 for uniform control. As depicted in FIG. 27, the one or more bladders 710, when expanded, form a convergent-divergent nozzle within the fan duct 172 upstream of the exit 676 of the fan duct 172 define by an aft trailing edge of the outer nacelle 534.

Figures 28A, 28B:
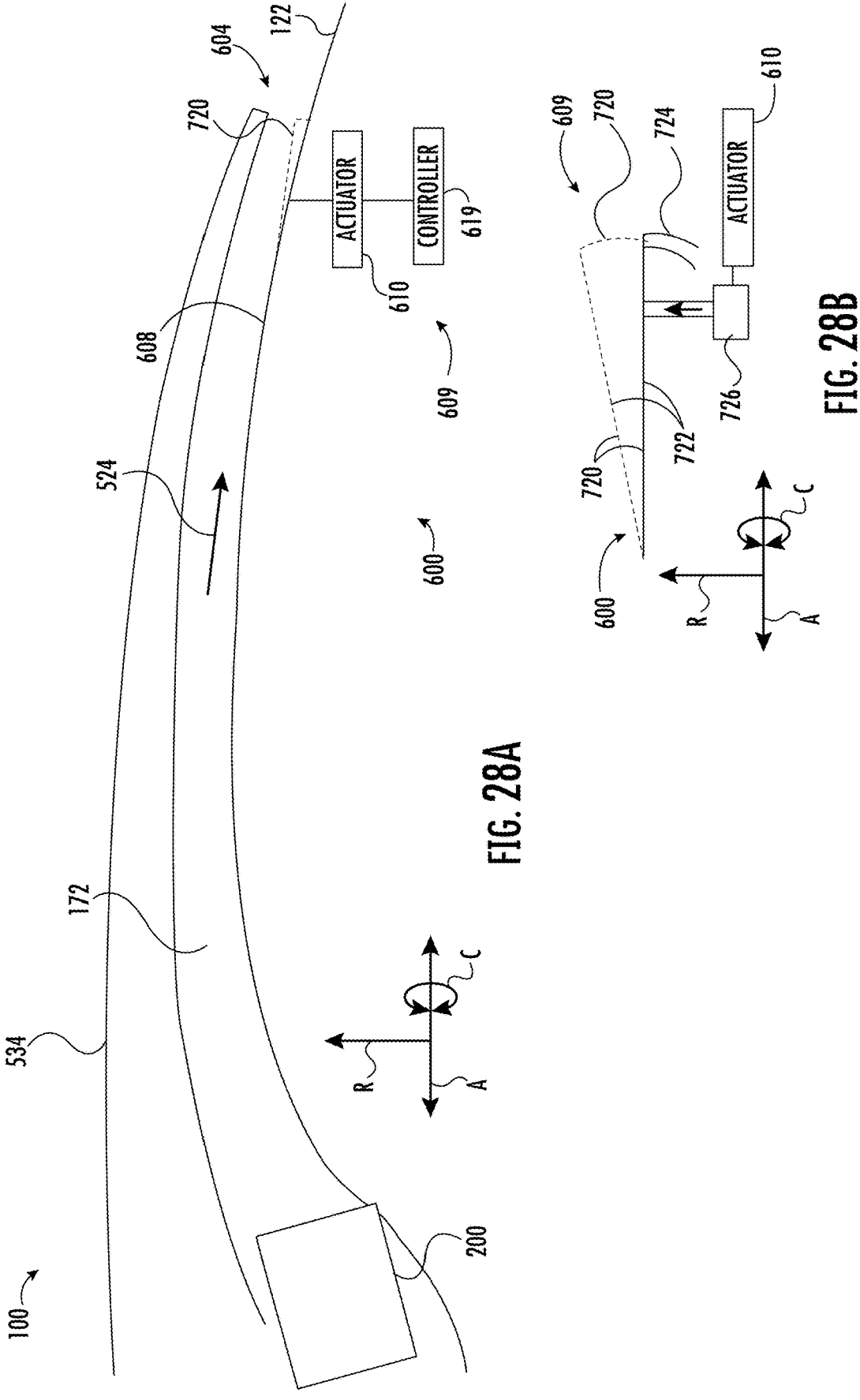
FIG. 28A is a schematic, cross-sectional view of a variable third stream exhaust area system in accordance with an exemplary aspect of the present disclosure.
FIG. 28B is a schematic, enlarged view of a portion of the variable third stream exhaust area system of FIG. 28A.

Referring now to FIGS. 28A and 28B, another embodiment of the variable third stream exhaust area system 600 is schematically depicted. In the illustrated embodiment, the variable third stream exhaust area system 600 includes one or more actuation devices 609 configured to vary an area of the fan duct exhaust nozzle 604. In the illustrated embodiment, the one or more actuation devices 609 include one or more sectors 720 of the core cowl 122 that are configured to extend radially outward to decrease an area of the fan duct 172 (depicted in dashed lines in FIGS. 28A and 28B). In exemplary embodiments, the one or more sectors 720 define at least a portion of the radially outward surface 608 of the core cowl 122 and the fan duct 172. In exemplary embodiments, the one or more sectors 720 may be formed from an elastic sheet material or a non-metallic elastic material to enable the sector 720 to extend radially outward to decrease an area of the fan duct 172 and retract radially inward to increase the area of the fan duct (e.g., returning to its non-extended position).

In exemplary embodiments, the one or more sectors 720 may be coupled to one or more actuators 610 which are actuable to force compressed air against a radially inward surface 722 of the sector 720 to force the sector 720 radially outward and release the pressure of the compressed air to return the sector 720 to its non-extended position. The one or more actuators 610 may be communicatively coupled to the one or more controllers 619 to enable automatic control of the one or more actuators 610. The one or more sectors 720 may comprise one or more semi-annular sectors 720. In cases where a plurality of sectors 720 are used, the one or more actuators 610 may be controlled independently or may be ganged together for uniform extension of the plurality of sectors 720.

In exemplary embodiments, one or more seals 724 may be located at one or more circumferential and/or axial locations at interfaces between the sector 720 and the core cowl 122 to prevent leakage of compressed air around the sector 720. Referring to FIG. 28B, the one or more actuators 610 may be coupled to a compressed air source 726 and actuable to direct compressed air against one or more sectors 720 to move the one or more sectors 720 radially outward to decrease the exit area of the fan duct exhaust nozzle 604. Correspondingly, the one or more actuators 610 are actuable to release the pressure from the compressed air source 726 to cause the one or more sectors 720 to return to a non-extended position and increase the exit area of the fan duct exhaust nozzle 604.

Figure 29:
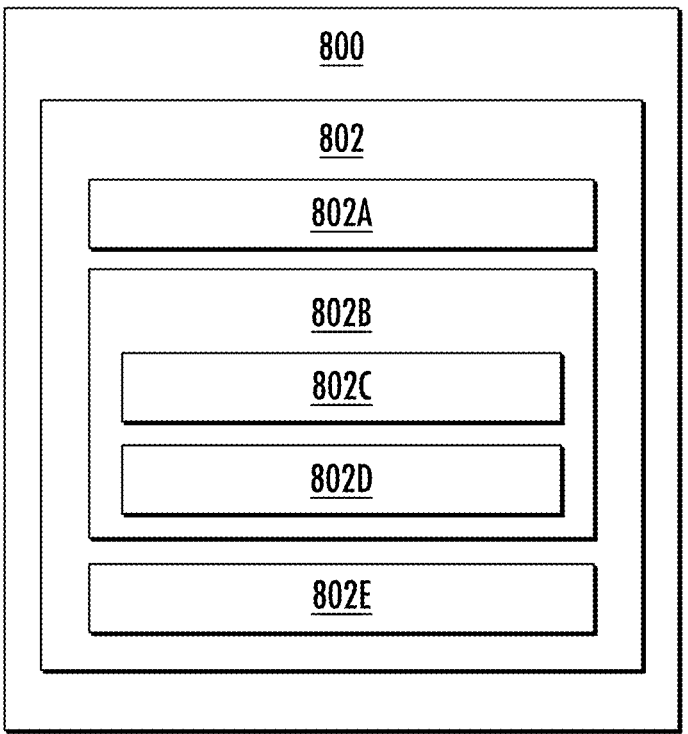
FIG. 29 is a block diagram depicting an example computing system according to exemplary embodiments of the present disclosure.

FIG. 29 provides an example computing system 800 according to example embodiments of the present disclosure. The computing devices or elements described herein, such as the controller 72, may include various components and perform various functions of the computing system 800 described below, for example.

As shown in FIG. 29, the computing system 800 can include one or more computing device(s) 802. The computing device(s) 802 can include one or more processor(s) 802A and one or more memory device(s) 802B. The one or more processor(s) 802A can include any suitable processing device, such as a microprocessor, microcontroller, integrated circuit, logic device, and/or other suitable processing device. The one or more memory device(s) 802B can include one or more computer-executable or computer-readable media, including, but not limited to, non-transitory computer-readable media, RAM, ROM, hard drives, flash drives, and/or other memory devices.

The one or more memory device(s) 802B can store information accessible by the one or more processor(s) 802A, including computer-readable instructions 802C that can be executed by the one or more processor(s) 802A. The computer-readable instructions 802C can be any set of instructions that when executed by the one or more processor(s) 802A, cause the one or more processor(s) 802A to perform operations. In some embodiments, the computer-readable instructions 802C can be executed by the one or more processor(s) 802A to cause the one or more processor(s) 802A to perform operations, such as any of the operations and functions for which the computing system 800 and/or the computing device(s) 802 are configured, such as controlling operation of one or more of the actuation devices 609 and/or actuators 610. The one or more processor(s) 802A may issue control commands to the one or more of the actuation devices 609 and/or actuators 610 based on data that is provided to or accessed by the one or more processor(s) 802A with respect to engine speed or engine pressure levels, or may be user-controlled, such as by a pilot of an aircraft or operator of the gas turbine engine. The computer-readable instructions 802C can be software written in any suitable programming language or can be implemented in hardware. Additionally, and/or alternatively, the computer-readable instructions 802C can be executed in logically and/or virtually separate threads on processor(s) 802A. The memory device(s) 802B can further store data 802D that can be accessed by the processor(s) 802A. For example, the data 802D can include models, lookup tables, databases, etc.

The computing device(s) 802 can also include a network interface 802E used to communicate, for example, with the other components of the computing system 800 (e.g., via a communication network). The network interface 802E can include any suitable components for interfacing with one or more network(s), including for example, transmitters, receivers, ports, controllers, antennas, and/or other suitable components. One or more devices can be configured to receive one or more commands from the computing device(s) 802 or provide one or more commands to the computing device(s) 802.

Thus, embodiments of the present disclosure vary the effective flow area of the fan duct 172 to enable an increase or decrease in a flow of air as the third stream 524 through the fan duct 172. Exemplary embodiments of the present disclosure provide one or more variable mechanisms to increase or vary exit areas for the third stream 524 from the fan duct 172. Embodiments of the present disclosure are configured to automatically control the third stream 524 exit areas to balance performance and operability of the gas turbine engine 100. In exemplary embodiments, the present disclosure provides one or more additional or secondary exit areas from the fan duct 172 in addition to the primary exit area at the aft-most exit of the fan duct 172. In exemplary embodiments, actuation of the exit area varying mechanisms may be automatically controlled. In exemplary embodiments, at certain operating conditions of the gas turbine 100 or an aircraft incorporating the gas turbine engine 100, such as during cruise, the fan duct 172 has a defined outlet area. However, at other operating conditions, the exit areas for the fan duct 172 may be increased such as, not by way of limitation, partially increased or partially open at higher power operating conditions such as takeoff and fully increased or fully open at lower power operating conditions and/or idle operation of the gas turbine 100 or an aircraft incorporating the gas turbine engine 100. Thus, embodiments of the present disclosure enable variable control of the flow or exit areas of the fan duct 172 to adjust the flow path for the third stream 524. In exemplary embodiments, actuation of the exit area varying mechanisms to increase the flow area for the third stream 524 can increase the flow area by 5% to 50% of the area of the fan duct exhaust nozzle 604 compared to when the exit area varying mechanisms are unactuated or closed. Additionally, in exemplary embodiments, actuation of the exit area varying mechanisms to increase the flow area for the third stream 524 can increase the flow rate of the third stream 524 through the fan duct 172 by 5% to 50% of the flow rate through the fan duct 172 compared to when the exit area varying mechanisms are unactuated or closed such as during cruise or climb operating phases of the gas turbine engine 100. Thus, during a takeoff phase of operation of the gas turbine engine 100, one or more variable mechanisms to increase or vary exit areas for the third stream 524 from the fan duct 172 may be partially deployed to provide a slight increase in the exit area for the third stream 524 from the fan duct 172 while also maintaining particular performance aspects of the gas turbine engine 100. During an idle phase of operation of the gas turbine engine 100, one or more variable mechanisms to increase or vary exit areas for the third stream 524 from the fan duct 172 may be further or fully deployed to provide an additional increase in the exit area for the third stream 524 from the fan duct 172.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

The gas turbine engine of any preceding clause, wherein the primary fan, the secondary fan, the compressor section, the combustion section, and the turbine section are arranged in serial flow order.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein The gas turbine engine of claim 1, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

A gas turbine engine including a turbomachine including a compressor section, a combustion section, and a turbine section arranged in serial flow order, the turbomachine defining an engine inlet to an inlet duct, a fan duct inlet to a fan duct, and a core inlet to a core duct, a primary fan driven by the turbomachine, a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and one or more actuation devices operably associated with the fan duct, the one or more actuation devices actuable to increase or decrease an exit area of the fan duct.

The gas turbine engine of any preceding clause, wherein the one or more actuation devices comprise at least one actuation device actuable to open or close one or more bleed passageways fluidly connected to the fan duct.

The gas turbine engine of any preceding clause, wherein the one or more bleed passageways extend radially inward or radially outward from the fan duct.

The gas turbine engine of any preceding clause, wherein the one or more bleed passageways extend longitudinally in at least one of an axial or circumferential direction.

The gas turbine engine of any preceding clause, further comprising a core cowl surrounding at least a portion of the turbomachine, and wherein at least one bleed passageway of the one or more bleed passageways extends through the core cowl.

The gas turbine engine of any preceding clause, further comprising an outer nacelle surrounding at least a portion of the gas turbine engine, and wherein at least one bleed passageway of the one or more bleed passageways extends into or through the outer nacelle.

The gas turbine engine of any preceding clause, wherein the fan duct comprises a fan duct exhaust nozzle located at an aft-most location of the fan duct, and wherein the one or more bleed passageways are located upstream of the fan duct exhaust nozzle.

The gas turbine engine of any preceding clause, wherein the one or more actuation devices comprise: a first actuation device; and a second actuation device; and wherein the first and second actuation devices are ganged together or are independently actuable.

The gas turbine engine of any preceding clause, further comprising a frame assembly defining one or more interface locations configured to support attachment of an outer nacelle to the gas turbine engine, and wherein at least one actuation device of the one or more actuation devices is disposed: upstream of at least one interface location of the one or more interface locations with respect to the airflow through the fan duct; downstream of the at least one interface location with respect to the airflow through the fan duct; or both.

The gas turbine engine of any preceding clause, further comprising a core cowl surrounding at least a portion of the turbomachine, and wherein at least one actuation device of the one or more actuation devices is actuable to open or close a bleed passageway fluidly connected to the fan duct and extending radially inward through the core cowl.

The gas turbine engine of any preceding clause, wherein the core cowl defines a core cowl vent, and when the bleed passageway is open, a portion of the airflow through the fan duct flows through the bleed passageway and is exhausted through the core cowl vent.

The gas turbine engine of any preceding clause, wherein at least a second actuation device of the one or more actuation devices is actuable to vary an area of the core cowl vent.

The gas turbine engine of any preceding clause, wherein the core cowl comprises one or more doors, and when the bleed passageway is open, a portion of the airflow through the fan duct flows through the bleed passageway and is exhausted through the one or more doors.

The gas turbine engine of any preceding clause, wherein the one or more doors are coupled to one or more actuation devices to enable automatic movement of the one or more doors.

The gas turbine engine of any preceding clause, wherein the airflow through the fan duct exits the fan duct through a fan duct exhaust nozzle, and wherein the one or more actuation devices comprises at least one flap defining at least a portion of the fan duct, wherein the at least one flap is movable to vary an area of the fan duct exhaust nozzle.

The gas turbine engine of any preceding clause, further comprising an outer nacelle defining at least a portion of the fan duct, and wherein the at least one flap is movably coupled to the outer nacelle.

The gas turbine engine of any preceding clause, further comprising at least one structural element disposed at least partially within the fan duct, and wherein at least one actuation device of the one or more actuation devices comprises at least one fairing axially movable to increase or decrease an area of the fan duct between the at least one structural element and the at least one fairing.

The gas turbine engine of any preceding clause, wherein the airflow through the fan duct is discharged from the fan duct through an exit a fan duct exhaust nozzle, and wherein the at least one structural element extends aft of the exit.

The gas turbine engine of any preceding clause, wherein at least one fairing of the one or more fairings is movable aft of the exit.

The gas turbine engine of any preceding clause, wherein the one or more fairings and the at least one structural element form at least one of a convergent nozzle or a convergent-divergent nozzle within the fan duct.

The gas turbine engine of any preceding clause, further comprising one or more flaps defining at least a portion of the fan duct, wherein at least one flap of the one or more flaps is rotatably coupled to a pylon structure coupling the gas turbine engine to an aircraft.

The gas turbine engine of any preceding clause, wherein at least one actuating device of the one or more actuating devices is actuable to move at least a portion of the core cowl.

The gas turbine engine of any preceding clause, wherein the at least one actuating device is coupled to a turbine rear frame.

The gas turbine engine of any preceding clause, wherein at least one actuating device of the one or more actuating devices is actuable to move at least a portion of the core cowl radially outward.

The gas turbine engine of any preceding clause, wherein at least one actuating device of the one or more actuating devices is actuable to move at least a portion of the outer nacelle radially inward.

The gas turbine engine of any preceding clause, wherein at least one actuating device of the one or more actuating devices is actuable to provide a flow of compressed air to move at least a portion of the core cowl or the outer nacelle into the fan duct to change an area of the fan duct The gas turbine engine of any preceding clause, further comprising a core cowl surrounding at least a portion of the turbomachine, and wherein at least one actuation device of the one or more actuation devices is actuable to move at least a portion of the core cowl radially inward.

The gas turbine engine of any preceding clause, further comprising a controller communicatively coupled to the one or more actuation devices and configured to control actuation of the one or more actuation devices.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct; and actuating one or more actuation devices operably associated with the fan duct to increase or decrease an exit area of the fan duct.

The method of any preceding clause, wherein actuating the one or more actuation devices comprises opening one or more bleed passageways fluidly connected to the fan duct.

The method of any preceding clause, wherein actuating the one or more actuation devices comprises moving one or more flaps defining at least a portion of the fan duct.

The method of any preceding clause, wherein a core cowl surrounds at least a portion of the turbomachine, and wherein actuating the one or more actuation devices comprises: opening one or more bleed passageways fluidly connected to the fan duct into the core cowl; and opening one or more core cowl vents positioned at an aft portion of the core cowl.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and one or more actuation devices operably associated with the fan duct, the one or more actuation devices actuable to open or close one or more bleed passageways fluidly connected to the fan duct.

The gas turbine engine of any preceding clause, further comprising a controller communicatively coupled to the one or more actuation devices and configured to control actuation of the one or more actuation devices.

We claim:

1. A gas turbine engine comprising:
a turbomachine comprising a compressor section, a combustion section, and a turbine section arranged in serial flow order, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
one or more actuation devices operably associated with the fan duct, the one or more actuation devices actuable to increase or decrease an exit area of the fan duct.

2. The gas turbine engine of claim 1, wherein the one or more actuation devices comprise at least one actuation device actuable to open or close a bleed passageway extending radially inward or radially outward from the fan duct.

3. The gas turbine engine of claim 2, wherein the bleed passageway extends longitudinally either axially or circumferentially.

4. The gas turbine engine of claim 1, wherein the one or more actuation devices comprise:
a first actuation device; and
a second actuation device; and wherein the first and second actuation devices are ganged together or independently actuable.

5. The gas turbine engine of claim 1, further comprising a frame assembly defining one or more interface locations configured to support attachment of an outer nacelle to the gas turbine engine, and wherein the one or more actuation devices are disposed:
upstream of at least one interface location of the one or more interface locations with respect to the airflow through the fan duct;
downstream of the at least one interface location with respect to the airflow through the fan duct; or
both upstream and downstream of the at least one interface location with respect to the airflow through the fan duct.

6. The gas turbine engine of claim 1, further comprising a core cowl surrounding at least a portion of the turbomachine, and wherein at least one actuation device of the one or more actuation devices is actuable to open or close a bleed passageway extending radially inward through the core cowl.

7. The gas turbine engine of claim 6, wherein the core cowl defines a core cowl vent, and when the bleed passageway is open, a portion of the airflow through the fan duct flows through the bleed passageway and is exhausted through the core cowl vent.

8. The gas turbine engine of claim 7, wherein at least a second actuation device of the one or more actuation devices is actuable to vary an area of the core cowl vent.

9. The gas turbine engine of claim 6, wherein the core cowl comprises one or more doors, and when the bleed passageway is open, at least a portion of the airflow through the fan duct flows through the bleed passageway and is exhausted through the one or more doors.

10. The gas turbine engine of claim 1, wherein the airflow through the fan duct exits the fan duct through a fan duct exhaust nozzle, and wherein the one or more actuation devices comprises at least one flap defining at least a portion of the fan duct, wherein the at least one flap is movable to vary an area of the fan duct exhaust nozzle.

11. The gas turbine engine of claim 10, further comprising an outer nacelle defining at least a portion of the fan duct, and wherein the at least one flap is movably coupled to the outer nacelle.

12. The gas turbine engine of claim 1, further comprising at least one structural element disposed at least partially within the fan duct, and wherein at least one actuation device of the one or more actuation devices comprises at least one fairing axially movable to increase or decrease an area of the fan duct between the at least one structural element and the at least one fairing.

13. The gas turbine engine of claim 1, further comprising a core cowl surrounding at least a portion of the turbomachine, and wherein at least one actuation device of the one or more actuation devices is actuable to move at least a portion of the core cowl radially inward.

14. The gas turbine engine of claim 1, further comprising a controller communicatively coupled to the one or more actuation devices and configured to control actuation of the one or more actuation devices.

15. A method of operating a gas turbine engine, comprising:
operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct; and actuating one or more actuation devices operably associated with the fan duct to increase or decrease an exit area of the fan duct.

16. The method of claim 15, wherein actuating the one or more actuation devices comprises opening one or more bleed passageways fluidly connected to the fan duct.

17. The method of claim 15, wherein actuating the one or more actuation devices comprises moving one or more flaps defining at least a portion of the fan duct.

18. The method of claim 15, wherein a core cowl surrounds at least a portion of the turbomachine, and wherein actuating the one or more actuation devices comprises:

opening one or more bleed passageways fluidly connected to the fan duct into the core cowl; and opening one or more core cowl vents positioned at an aft portion of the core cowl.

19. A gas turbine engine comprising:

a turbomachine comprising a compressor section, a combustion section, and a turbine section arranged in serial flow order, the turbomachine defining an engine inlet to an inlet duct, a fan duct inlet to a fan duct, and a core inlet to a core duct;

a primary fan driven by the turbomachine;

a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and one or more actuation devices operably associated with the fan duct, the one or more actuation devices actuable to open or close one or more bleed passageways fluidly connected to the fan duct.

20. The gas turbine engine of claim 19, further comprising a controller communicatively coupled to the one or more actuation devices and configured to control actuation of the one or more actuation devices.

\* \* \* \* \*